US010540004B2

United States Patent
Sanger et al.

(10) Patent No.: US 10,540,004 B2
(45) Date of Patent: Jan. 21, 2020

(54) TECHNIQUE FOR CONTROLLING VIRTUAL IMAGE GENERATION SYSTEM USING EMOTIONAL STATES OF USER

(71) Applicant: MAGIC LEAP, INC., Plantation, FL (US)

(72) Inventors: George Alistair Sanger, Coronado, CA (US); Samuel A. Miller, Hollywood, FL (US); Graeme John Devine, Rockwall, TX (US)

(73) Assignee: Magic Leap, Inc., Plantation, FL (US)

( * ) Notice: Subject to any disclaimer, the term of this patent is extended or adjusted under 35 U.S.C. 154(b) by 107 days.

(21) Appl. No.: 15/655,563

(22) Filed: Jul. 20, 2017

(65) Prior Publication Data

US 2018/0024626 A1 Jan. 25, 2018

Related U.S. Application Data

(60) Provisional application No. 62/364,957, filed on Jul. 21, 2016.

(51) Int. Cl.
*A63F 13/52* (2014.01)
*G06F 3/01* (2006.01)
(Continued)

(52) U.S. Cl.
CPC .............. *G06F 3/012* (2013.01); *A63F 13/21* (2014.09); *A63F 13/52* (2014.09); *A63F 13/65* (2014.09);
(Continued)

(58) Field of Classification Search
CPC .............. G02B 27/017; G02B 27/0172; G02B 2027/014; G02B 2027/0187; A63F 13/21;
(Continued)

(56) References Cited

U.S. PATENT DOCUMENTS 6,066,075 A  5/2000 Poulton
6,556,775 B1 * 4/2003 Shimada ................ H04N 5/272
                                                     348/E5.058
(Continued)

FOREIGN PATENT DOCUMENTS

WO  WO 2015/095737  6/2015

OTHER PUBLICATIONS

PCT Invitation to Pay Additional Fees for International Appln. No. PCT/US2017/043133, Applicant Magic Leap, Inc., dated Aug. 31, 2017 (2 pages).
(Continued)

*Primary Examiner* — Michael A Cuff
(74) *Attorney, Agent, or Firm* — Vista IP Law Group LLP

(57) ABSTRACT

A method of operating a virtual image generation system comprises allowing an end user to interact with a three-dimensional environment comprising at least one virtual object, presenting a stimulus to the end user in the context of the three-dimensional environment, sensing at least one biometric parameter of the end user in response to the presentation of the stimulus to the end user, generating biometric data for each of the sensed biometric parameter(s), determining if the end user is in at least one specific emotional state based on the biometric data for the each of the sensed biometric parameter(s), and performing an action discernible to the end user to facilitate a current objective at least partially based on if it is determined that the end user is in the specific emotional state(s).

35 Claims, 8 Drawing Sheets

(51) Int. Cl.
*G06F 16/56* (2019.01)
*G06F 16/58* (2019.01)
*A63F 13/21* (2014.01)
*A63F 13/65* (2014.01)
*G06K 9/00* (2006.01)
*G06T 19/00* (2011.01)
*G02B 27/01* (2006.01)

(52) U.S. Cl.
CPC .............. *G06F 3/011* (2013.01); *G06F 16/56* (2019.01); *G06F 16/5866* (2019.01); *G06K 9/00308* (2013.01); *G06T 19/006* (2013.01); *G02B 27/0172* (2013.01); *G06F 3/013* (2013.01); *G06F 3/015* (2013.01); *G06F 2203/011* (2013.01)

(58) Field of Classification Search
CPC ........ A63F 13/212; A63F 13/52; A63F 13/65; G06T 19/006; G06F 3/011; G06F 3/012; G06F 3/013; G06F 3/015; G06F 16/56; G06F 16/5866; G06F 2203/011; G06K 9/00308; G06K 9/00671
USPC ......................................................... 463/13
See application file for complete search history.

(56) References Cited

U.S. PATENT DOCUMENTS

| | | | | |
|---|---|---|---|---|
| 8,386,313 | B2 * | 2/2013 | Pradeep | A61B 5/0402 705/14.42 |
| 8,814,691 | B2 * | 8/2014 | Haddick | G02B 27/017 463/42 |
| 9,336,481 | B1 | 5/2016 | Ionson | |
| 9,417,452 | B2 | 8/2016 | Schowengerdt et al. | |
| 10,013,892 | B2 * | 7/2018 | Aslan | G09B 5/08 |
| 10,042,023 | B2 * | 8/2018 | Warr | G01R 33/4806 |
| 10,191,920 | B1 * | 1/2019 | Grundmann | G06F 3/04842 |
| 2001/0056225 | A1 | 12/2001 | Devito | |
| 2005/0216243 | A1 | 9/2005 | Graham et al. | |
| 2008/0065468 | A1 | 3/2008 | Berg et al. | |
| 2009/0195392 | A1 | 8/2009 | Zalewski | |
| 2011/0007174 | A1 * | 1/2011 | Bacivarov | G06K 9/00281 348/222.1 |
| 2011/0190913 | A1 * | 8/2011 | Van De Sluis | A63J 17/00 700/94 |
| 2011/0207100 | A1 | 8/2011 | Brokken et al. | |
| 2012/0275757 | A1 * | 11/2012 | Vorbau | H01L 35/30 386/230 |
| 2013/0022950 | A1 | 1/2013 | Muniz Simas et al. | |
| 2014/0015858 | A1 * | 1/2014 | Chiu | G09G 5/026 345/633 |
| 2014/0316191 | A1 | 10/2014 | De Zambotti et al. | |
| 2014/0354532 | A1 | 12/2014 | Mullins et al. | |
| 2015/0170638 | A1 | 6/2015 | Bezar | |
| 2015/0301592 | A1 * | 10/2015 | Miller | G06F 3/011 345/156 |
| 2015/0339363 | A1 | 11/2015 | Moldoveanu et al. | |
| 2015/0341717 | A1 * | 11/2015 | Song | H04R 1/08 381/110 |
| 2017/0098122 | A1 * | 4/2017 | el Kaliouby | A61B 5/744 |
| 2017/0339338 | A1 * | 11/2017 | Gordon | G06K 9/00302 |
| 2018/0254097 | A1 * | 9/2018 | Gani | G16H 20/70 |

OTHER PUBLICATIONS

PCT International Search Report and Written Opinion for International Appln. No. PCT/US2017/043133, Applicant Magic Leap, Inc., dated Aug. 31, 2017 (19 pages).
Extended European Search Report dated Jun. 17, 2019 for European Patent Application No. 17831892.9 [ML-0329EP].

* cited by examiner

TECHNIQUE FOR CONTROLLING VIRTUAL IMAGE GENERATION SYSTEM USING EMOTIONAL STATES OF USER

CROSS-REFERENCE TO RELATED APPLICATION(S)

This application claims priority from U.S. Provisional Patent Application Ser. No. 62/364,957, entitled "TECHNIQUE FOR CONTROLLING VIRTUAL IMAGE GENERATION SYSTEM USING EMOTIONAL STATES OF USER," filed on Jul. 21, 2016. The content of the aforementioned patent application is hereby expressly incorporated by reference in its entirety.

FIELD OF THE INVENTION

The present invention generally relates to systems and methods configured to facilitate interactive virtual and augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the end user.

For example, referring to FIG. 1, an augmented reality scene 4 is depicted wherein a user of an AR technology sees a real-world park-like setting 6 featuring people, trees, buildings in the background, and a concrete platform 8. In addition to these items, the end user of the AR technology also perceives that he or she "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR systems typically employ head-worn displays (or helmet-mounted displays, or smart glasses) that are at least loosely coupled to a user's head, and thus move when the end user's head moves. If the end user's head motions are detected by the display system, the data being displayed can be updated to take the change in head pose (i.e., the orientation and/or location of user's head) into account.

As an example, if a user wearing a head-worn display views a virtual representation of a three-dimensional (3D) object on the display and walks around the area where the 3D object appears, that 3D object can be re-rendered for each viewpoint, giving the end user the perception that he or she is walking around an object that occupies real space. If the head-worn display is used to present multiple objects within a virtual space (for instance, a rich virtual world), measurements of head pose can be used to re-render the scene to match the end user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display system to view directly the light from real objects in the environment. The transparent element, often referred to as a "combiner," superimposes light from the display over the end user's view of the real world.

In VR and AR systems, it is desirable to increase the quality of the experience and/or the engagement between the user and the VR/AR system by eliminating or de-emphasizing factors that are found to discourage or prevent satisfactory engagement, while emphasizing factors that are found to encourage or increase such engagement. Traditionally, a focus group of users is assembled to test the hardware and/or software of the VR/AR systems. The users can be queried regarding the features that they liked or disliked. Their responses can then be analyzed and use to redesign or otherwise modify the hardware/software features of the VR/AR systems off-line. Although the use of off-line focus groups generally results in improvements in the user experience with the VR/AR system that is being tested, this technique does not tailor the VR/AR system to a particular user, does not take into account the user's subconscious motivations for engaging the VR/AR system, may be relatively costly and time-consuming due to the repeated use of focal groups to iteratively make improvements in the VR/AR system.

There, thus, is a need to increase the quality of the experience and/or the engagement between the user and a VR/AR system.

SUMMARY

In accordance with a first aspect of the present inventions, a method of operating a virtual image generation system comprises allowing an end user to interact with a three-dimensional environment comprising at least one virtual object. Allowing the end user to interact with the three-dimensional environment may comprise rendering a plurality of synthetic image frames of a three-dimensional environment, and sequentially displaying the synthetic image frames to the end user. The synthetic image frames may be displayed in the field of view of the end user via a frame structure mounted to the head of the end user, and may be superimposed over a real scene visualized by the end user.

The method further comprises presenting a stimulus (e.g., visually or aurally) to the end user in the context of the three-dimensional environment, sensing at least one biometric parameter of the end user in response to the presentation of the stimulus to the end user, and generating biometric data for each of the sensed biometric parameter(s). In one embodiment, the biometric parameter(s) of the end user are sensed at a plurality of different times in response to the presentation of the stimulus, and the biometric data is generated at these different times. The sensed biometric parameter(s) may comprise at least one facial expression (e.g., one or both of an attitude of the mouth and crow's feet around the eyes of the end user), hunching of shoulders, respiration rate, heart rate, body temperature, blood pressure, frequency and/or location of hand movements, frequency and/or location of body twitches, elapsed time between eye movements, and a micro-expression.

The method further comprises determining if the end user is in at least one specific emotional state (e.g., one of anger, contempt, disgust, fear, happiness, sadness, surprise, confusion, shame, attentiveness, exhaustion, relaxation, frustration, boredom, embarrassment) based on the biometric data for each of the sensed biometric parameter(s). The sensed biometric parameter(s) may comprise a plurality of different sensed biometric parameters, in which case, determining if the end user is in the specific emotional state(s) may comprise performing a pattern recognition analysis on the generated biometric data. For example, if the sensed biometric parameter(s) comprises an attitude of the mouth and crow's feet around the eyes of the end user), the specific emotional state(s) may be determined to comprise happiness.

Determining if the end user is in the specific emotional state(s) may comprise comparing the generated biometric data to reference biometric data correlated to the at least one specific emotional state. For example, the generated biometric data for one of the sensed biometric parameter(s) may be a biometric scalar data value, and the reference biometric data may comprise a reference biometric value range, in which case, comparing the generated biometric data to the reference biometric data may comprise determining whether the biometric scalar data value falls within the reference biometric value range. As another example, the generated biometric data for one of the sensed biometric parameter(s) may be a biometric multi-dimensional data vector, and the reference biometric data may comprise a reference biometric multi-dimensional data vector, in which case, comparing the generated biometric data to the reference biometric data may comprise performing a correlation function between the generated biometric multi-dimensional data vector and the reference biometric multi-dimensional data vector. In an optional embodiment, determining if the end user is in the specific emotional state may further comprise retrieving the reference biometric data from a custom emotional state profile of the end user.

The method further comprises performing an action discernible to the end user to facilitate a current objective at least partially based on if it is determined that the end user is in the specific emotional state(s).

In one embodiment, the current objective is to evoke a desired emotional state in the end user for a desired duration, or to not evoke an undesired emotional state in the end user for a desired duration, or to evoke a plurality of different desired emotional states in the end user for a desired duration; for example, for one time in a relevant period of time, a plurality of times in a relevant period of time, or continuously over a relevant period of time.

For example, the current objective may be to evoke a desired emotional state in the end user for a desired duration, the specific emotional state(s) may be consistent with the desired emotional state. If the end user is determined to be in the specific emotional state(s) for the desired duration, the action performed may comprise making the stimulus more available to the end user, and in contrast, if the end user is determined to not be in the specific emotional state(s) for the desired duration, the action performed may comprise making the stimulus less available to the end user.

As another example, the current objective may be to not evoke an undesired emotional state in the end user for a desired duration, and the specific emotional state(s) may be consistent with the undesired emotional state. If the end user is determined to not be in the at least one specific emotional state for the desired duration, the action performed may comprise making the stimulus more available to the end user, and in contrast, if the end user is determined to be in the specific emotional state(s) for the desired duration, the action performed may comprise making the stimulus less available to the end user.

As still another example, the current objective may be to evoke a plurality of different desired emotional states in the end user for a desired duration, and the plurality of different emotional states may be consistent with the plurality of desired emotional states. If the end user is determined to be in the plurality of different emotional states for the desired duration, the action performed may comprise making the stimulus more available to the end user, and in contrast, if the end user is determined to not be in the plurality of different emotional states for the desired duration, and action performed may comprise making the stimulus less available to the end user.

In another embodiment, the stimulus takes the form of a video game, program, musical background piece, reward, virtual object, or alert, in which case, the action performed may comprise making the video game, program, musical background piece, reward, virtual object, or alert more available or less available to the end user. In still another embodiment, the stimulus takes the form of a feature of a video game, program, musical background piece, reward, virtual object, or alert, in which case, the action performed may comprise making the video game, program, musical background piece, reward, or alert more available or less available to the end user.

In still another embodiment, the stimulus takes the form of a strategy video game, the current objective is to beat the end user at the strategy video game, in which case, the action performed may comprise making a game move using the specific emotional state determination against the end user. For example, the strategy video game may be a playing card video game (e.g., a poker video game) having one or more simulated players that play against the end user, and the specific emotional state(s) may be one that indicates whether or not the end user is bluffing, in which case, the action performed may comprise the simulated player(s) playing cards against the end user using knowledge of whether or not the end user is bluffing.

In yet another embodiment, the stimulus takes the form of a question presented to the end user, and the current objective is to determine whether or not the end user is lying in response to the question, in which case, the action performed may comprise informing the end user whether or not the end user is lying using the specific emotional state determination.

In yet another embodiment, the stimulus takes the form of a plurality of options presented to the end user, and the current objective is to determine which one of the plurality of objects the end user is thinking of, in which case, the action performed may comprise informing the end user which object the end user is thinking of using the specific emotional state determination.

In yet another embodiment, the stimulus takes the form of a simulated face, and the current objective is to make the end user laugh, in which case, the action performed may comprise determining if the end user is about to laugh using the specific emotional state determination, and modifying the simulated face to make the end user laugh.

In accordance with a second aspect of the present inventions, a method of operating a virtual image generation system comprises allowing an end user to interact with a three-dimensional environment comprising at least one virtual object. Allowing the end user to interact with the three-dimensional environment may comprise rendering a plurality of synthetic image frames of a three-dimensional environment, and sequentially displaying the synthetic image frames to the end user. The synthetic image frames may be displayed in the field of view of the end user via a frame structure mounted to the head of the end user, and may be superimposed over a real scene visualized by the end user.

The method further comprises presenting a stimulus (e.g., visually or aurally) to the end user in the context of the three-dimensional environment. The stimulus may be, e.g., a video game, program, musical background piece, reward, virtual object, or alert, or feature thereof.

The method further comprises sensing at least one biometric parameter of the end user in response to the presentation of the stimulus to the end user, and generating biometric data for each of the sensed biometric parameter(s). In one embodiment, the biometric parameter(s) of the end user are sensed at plurality of different times in response to the presentation of the stimulus, and the biometric data is generated at these different times. The sensed biometric parameter(s) may comprise at least one facial expression (e.g., one or both of an attitude of the mouth and crow's feet around the eyes of the end user), hunching of shoulders, respiration rate, heart rate, body temperature, blood pressure, frequency and/or location of hand movements, frequency and/or location of body twitches, elapsed time between eye movements, and a micro-expression.

The method further comprises correlating the generated biometric data to a specific emotional state (e.g., at least one of anger, contempt, disgust, fear, happiness, sadness, surprise, confusion, shame, attentiveness, exhaustion, relaxation, frustration, boredom, embarrassment) of the end user. In one embodiment, the generated biometric data is correlated to the specific emotional state with a particular confidence level. In one embodiment, correlating the generated biometric data to the specific emotional state comprises tracking a duration (e.g., one of a period of time and a number of times the stimulus is presented to the end user that the end user interacts with the three-dimensional environment while the stimulus is presented to the end user), comparing the tracked duration to a threshold duration, and correlating the generated biometric data to the specific emotional state based on the comparison. In another embodiment, correlating the generated biometric data to the specific emotional state comprises repeating the stimulus presenting, biometric parameter sensing, and biometric data generating steps several times with different stimuli to evoke different emotional states or different extents of an emotional state in the end user, and selecting the biometric data that best matches the specific emotional state.

The method further comprises deriving reference biometric data from the correlated biometric data, and storing the reference biometric data in correlation with the specific emotional state in a custom profile of the end user. In one embodiment, the generated biometric data for one of the sensed biometric parameter(s) is a biometric scalar data value, and the reference biometric data comprises a reference biometric value range. In another embodiment, the generated biometric data for one of the sensed biometric parameter(s) is a biometric multi-dimensional data vector, and the reference biometric data comprises a reference biometric multi-dimensional data vector.

An optional method further comprising presenting a subsequent stimulus (which may be different from the previously presented stimulus) to the end user in the context of another three-dimensional environment, sensing the at least one sensed biometric parameter of the end user in response to the subsequently presented stimulus, generating biometric data for each of the biometric parameter(s) sensed in response to the subsequently presented stimulus, retrieving the reference biometric data from the custom profile, comparing the generated biometric data to the retrieved reference biometric data, and determining that the end user is in the specific emotional state based on the comparison.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

The description that follows relates to display systems and methods to be used in augmented reality systems. However, it is to be understood that the while the invention lends itself well to applications in augmented reality, the invention, in its broadest aspects, may not be so limited. For example, the invention can be applied to any virtual image generation system, including virtual reality systems. Thus, while often described herein in terms of an augmented reality system, the teachings should not be limited to such systems of such uses.

Figure 1:
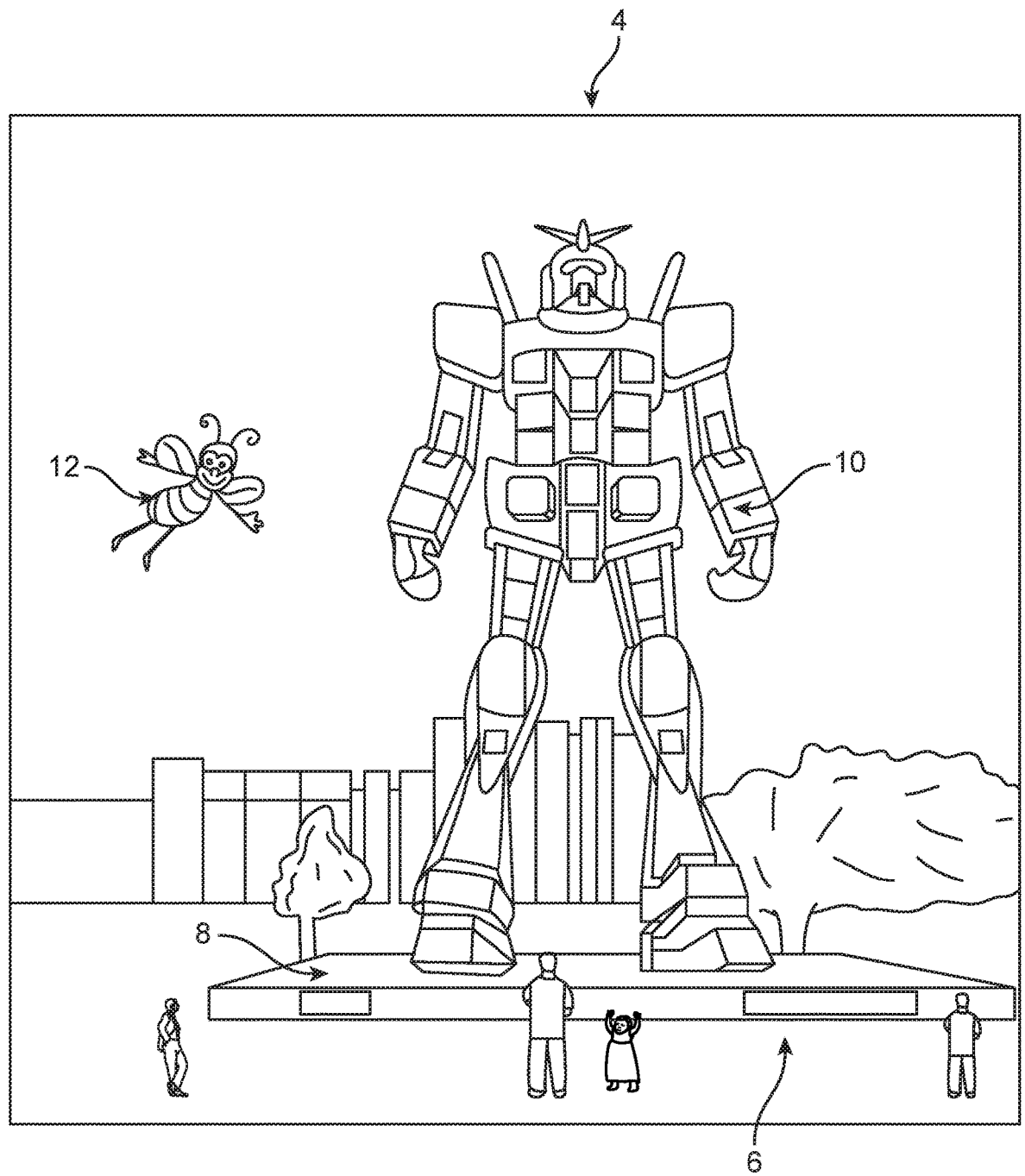
FIG. 1 is a picture of a three-dimensional augmented reality scene that can be displayed to an end user by a prior art augmented reality generation device.
Figure 2:
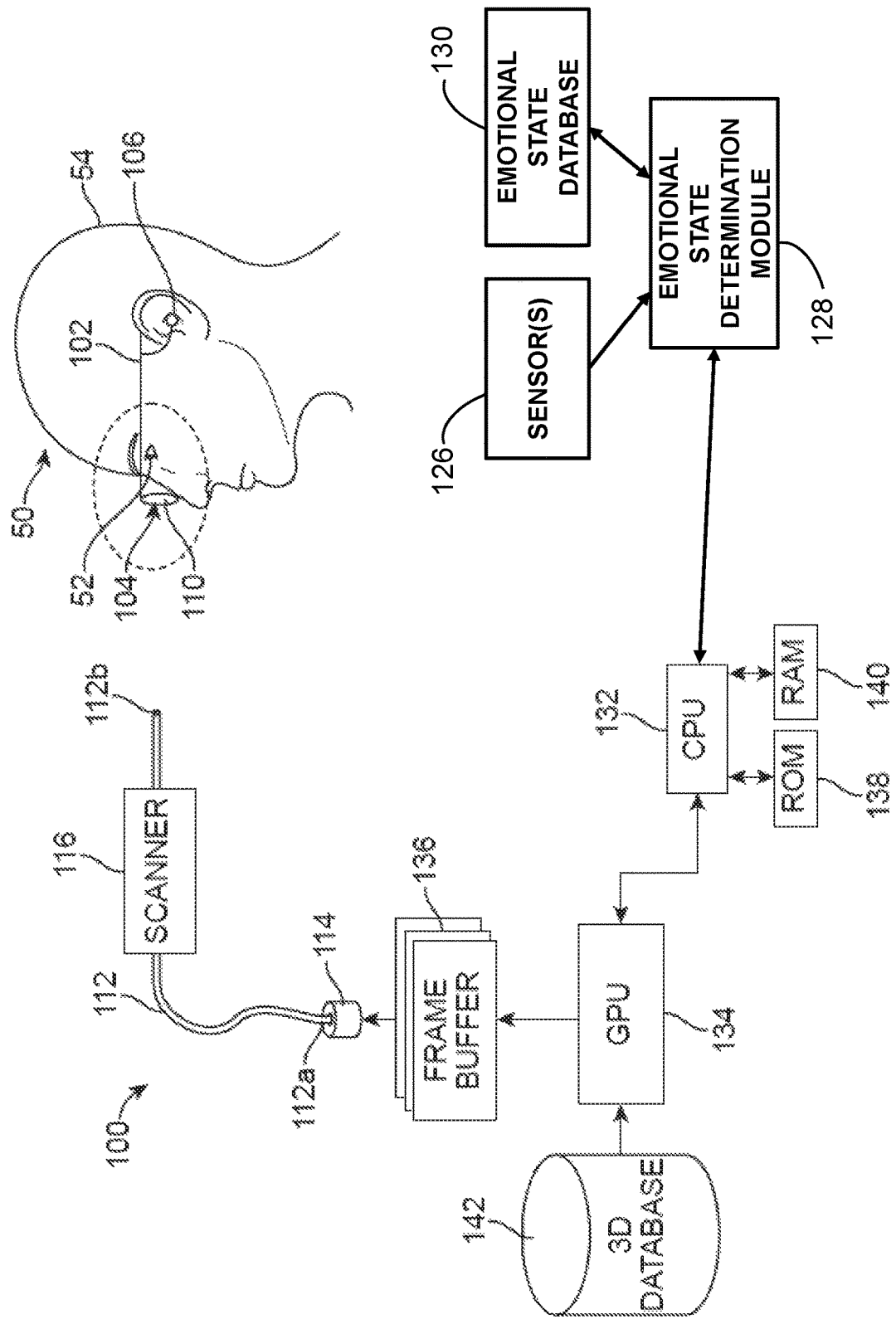
FIG. 2 is a block diagram of an augmented reality system constructed in accordance with one embodiment of the present inventions.

Referring to FIG. 2, one embodiment of an augmented reality system 100 constructed in accordance with present inventions will now be described. The augmented reality system 100 provides images of virtual objects intermixed with real objects in a field of view of an end user 50. The augmented reality system 100, and the various techniques taught herein, may be employed in applications other than augmented reality. For example, various techniques may be applied to any projection or display system. Or, the various techniques described herein may be applied to pico projectors where movement may be made by an end user's hand rather than the head. Thus, while often described herein in terms of an augmented reality system, the teachings should not be limited to such systems of such uses.

There are two fundamental approaches when operating the augmented reality system 100. In the first approach, referred to as "video see-through," the augmented reality system 100 captures elements of a real scene, superimposes virtual objects onto the captured real scene, and presents the composite image to the end user 50 onto a display. In the second approach, referred to as "optical see-through," the end user 50 directly sees the real scene through a transparent or semi-transparent) display, and the augmented reality system 100 superimposes virtual objects onto the display over the end user's view of the real scene.

More pertinent to the present inventions, the augmented reality system 100 determines the emotional state of an end user in response to the presentation of stimuli to the end user in the context of a three-dimensional environment, and performs an action discernible to the end user 50 in response to the determined emotional state in accordance with the current objective of the augmented reality system 100, as will be described in further detail below. In this specification, the term "emotional state" is used in a way that is meant to cover, but not limited to, what are commonly referred to as static emotional states, such as "happy," "sad," "frustrated," and so forth.

The augmented reality system 100 comprises a frame structure 102 worn by an end user 50, a display system 104 carried by the frame structure 102, such that the display system 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display system 104 is designed to sequentially display synthetic image frames to the end user 50, and in the illustrated embodiment, to present the eyes 52 of the end user 50 with image-wise modulated light that can be comfortably perceived as virtual content augmentations to physical reality, with high-levels of image quality and three-dimensional perception, as well as being capable of presenting two-dimensional content. The display system 104 presents a sequence of frames at high frequency that provides the perception of a single coherent scene.

In the illustrated embodiment, the display system 104 comprises a projection subsystem 108 and a partially transparent eyepiece 110 through which the projection subsystem 108 projects images in the field of end user 50. The eyepiece 110 is positioned in the end user's 50 field of view between the eyes 52 of the end user 50 and an ambient environment. In the illustrated embodiment, the projection subsystem 108 includes one or more optical fibers 112 (e.g. single mode optical fiber), each of which has one end 112a into which light is received and another end 112b from which light is provided to the partially transparent eyepiece 110. The projection subsystem 108 may also include one or more light sources 114 that produces the light (e.g., emits light of different colors in defined patterns), and communicatively couples the light to the other end 112a of the optical fiber(s) 112. The light source(s) 114 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and are highly energy efficient.

The display system 104 may further comprise a scanning device 116 that scans the optical fiber(s) 112 in a predetermined pattern in response to control signals. Further details explaining an example of a display system 104 are provided in U.S. patent application Ser. No. 14/212,961, entitled "Display System and Method," which is expressly incorporated herein by reference. It should be appreciated that although the display system 104 has been described as being implemented with a scanning fiber technology, it should be appreciated that the display system 104 may be based on any display technology, e.g., liquid crystal displays (LCD), digital light processing (DLP) displays, etc.

Referring back to FIG. 2, the augmented reality system 100 further comprises one or more sensors 126. The sensor(s) 126 may sense, measure, or collect information about movements of the head 54 of the end user 50 (e.g., speed, acceleration, and position) and/or the eye position and inter-ocular distance of the end user 50 (movement, blinking, and depth of focus) to facilitate the rendering of images of a three-dimensional environment from the perspective of the point of view of the end user 50, such that the end user 50 is immersed in the three-dimensional environment.

More significant to the present inventions, in response to stimuli presented to the end user 50, the sensor(s) 126 are configured for sensing biometric parameters of the end user 50 and generating biometric data representative of these sensed biometric parameters. The stimuli generated by the augmented reality system 100 can be any stimuli that may evoke a physical reaction by the end user 50. The stimuli may be visually presented to the end user 50 via the display system 104 and/or aurally presented to the end user 50 via the speaker(s) 106. The stimuli may even be tactilely presented to the end user 50 via mechanical actuators (not shown). Each biometric parameter can be sensed only one time or at a plurality of different times in response to the presentation of a particular stimulus, with the biometric data being generated each time the respective biometric parameter is sensed. The biometric data for each biometric parameter that is sensed may take the form of one or more values. For example, the biometric data may be a single data value (e.g., in the form of a scalar data value), a one-dimensional array of data values (e.g., a feature vector), or a two-dimensional array of data values (e.g., in the form of image data) for each sensed biometric parameter.

In one case, the stimuli may be related to the manner in which one virtual object (e.g., a screen) transitions to another virtual object (e.g., another screen). For example, one screen may instantaneously transition to another screen or one screen may dissolve into another screen. In this case, different stimuli are ways in which one screen transitions to another screen, which may evoke different emotions in the end user 50. For example, the end user 50 may experience satisfaction with the instantaneous transition between the screens, but experience frustration with the dissolving transition between the screens.

In another case, the stimuli may be related to the composition of a virtual object (e.g., a menu). For example, one type of menu may have square buttons, and another type of menu may have circular buttons. In this case, different stimuli are different compositions of a menu, which may evoke different emotions in the end user 50. For example, the end user 50 may experience relaxation with a menu having square buttons, but experience boredom with a menu having circular buttons.

In still another case, the stimuli may be related to the genre of a background musical piece or a feature thereof. For example, one type of music (e.g., rock) can be played in the background or another type of music (e.g., classical) may be played in the background. In this case, different stimuli are different types of music, which may evoke different emotions in the end user 50. For example, the end user 50 may experience anxiety with rock music, but experience joy with the classical music.

In yet another case, the stimuli may be related to the nature of alerts. For example, one type of alert (e.g., a whooping sound) can be sounded to the end user 50 or another type of alert (e.g., a blinking light) can be displayed to the end user 50. In this case, different stimuli are different types of alerts, which may evoke different emotions in the end user 50. For example, the end user 50 may experience attentiveness with the whooping sound, but may experience inattentiveness with the blinking light.

In yet another case, the stimuli may be related to video game or program or a feature thereof. For example, one type of video game (e.g., action video game) can be presented to the end user 50, or another type of video game (e.g., strategy video game) can be presented to the end user 50. In this case, different stimuli are different video games, which may evoke different emotions in the end user 50. For example, the end user 50 may experience excitement or a range of different emotions with the action video game, but experience boredom with the intellectual video game.

In yet another case, the stimuli may be related to an audio-visual reward presented to the end user 50 in response to a successful outcome of the end user 50 interacting with the three-dimensional environment (e.g., when playing a video game), or even an audio-visual penalty that is presented to the end user 50 in response to an unsuccessful outcome of the end user 50 interacting with the three-dimensional environment. These rewards/penalties may vary in length, duration, content, etc., from a simple audio beep to an elaborate animation. The rewards/penalties may, e.g., feature a dog, a paperclip, a bunch of dancing goblins, first bumps or high fives, a slot machine noise, a scene from a movie, etc.

In yet another case, the stimuli can even be the ambient light originating from the three-dimensional environment or a video of the three-dimensional environment within the field of view of the user 50. In the latter case, a forward-facing camera (not shown) may be amounted to the frame structure 102 to capture images of the three-dimensional environment within the field of view of the user 50.

The generated biometric data will be used to determine the emotional state of the end user 50 as the end user 50 is presented with the stimuli. Such emotional states may include, but are not limited to, the seven basic emotions, such as anger, contempt, disgust, fear, happiness, sadness, and surprise, although there may be other emotional states, such as confusion, shame, attentiveness, exhaustion, relaxation, frustration, boredom, embarrassment.

Each biometric parameter may take the form of any parameter related to a physical reaction indicative of the end user's 50 emotional state. The best physical indicator of the emotional state of the end user 50 is the facial expression of the end user 50. Facial expressions of a human are caused by the movement of muscles that connect to the skin and fascia in the face. These muscles move the skin, creating lines and folds and causing the movement of facial features, such as the mouth and eyebrows.

The emotion of fear is typically expressed by eyebrows squeezed together to form a crease, tight and straightened eyelids, and a slightly lowered head with eyes looking through the lowered brow. The facial expression is tense and strained. The emotion of contempt is typically expressed by a unilateral (one-sided) expression, with one lip corner pulled up and back, with the eyes on a neutral position. The emotion of disgust may be expressed by pulled down eyebrows, wrinkled nose, and upper lip pulled up with lips staying loose. The emotion of fear is typically expressed by widened eyes, slanted eyebrows that go upward, and slightly open mouth. The emotion of happiness is typically expressed by a smile (upward lifting of the corners of the mouth), pushed up cheeks, crescent-shaped eyes, showing teeth, and crow's feet around the eyes. The emotion of sadness is typically expressed by a frown, upward slanting of the eyebrows, and downward drooping face. The emotion of surprise is typically expressed by widened eyes and gaping mouth, and bigger pupils. The emotion of confusion is typically expressed by scrunching of the forehead and nose, one raised eyebrow, and lips pursed together. The emotion of shame is typically expressed by downward turned eyes, downward facing head, and frowning or with a neutral mouth (downlifting or no lifting of the corners of the mouth). The emotion of attentiveness is typically expressed by fixation of eyes if the person is focused on an object, or upward looking eyes or eyes averted to one side with less blinking if the person is focused on a thought. The emotion of exhaustion is typically expressed with half-open eyelids, but raised eyebrows. The emotion of relaxation is typically expressed with a slight smile and slightly closed eyelids. The emotion of frustration is typically expressed by inward slanting eyebrows that are squeezed into a wrinkle, raised chin, lips pressed together, mouth twisted to one side, and a crease on the cheek. The emotion of boredom is typically expressed by half-open eyelids, raised eyebrows, and a slightly puckered side placement of the mouth. The emotion of embarrassment is typically expressed by a forced smile, which is a grin made without lifting the corners of the mouth, and blushing.

As such, each biometric parameter is related to bodily features involved in facial expression, including, but not limited to, an attitude (or shape) of the mouth, crow's feet around the eyes, eyebrow angle, and eye movements, although biometric parameters related to bodily features not involved in facial expressions, such as hunching of shoulders, respiration rate, heart rate, body temperature, blood pressure, frequency and/or location of hand movements, and frequency and/or location of body twitches, may be used.

Micro-expressions are the facial expressions that flash on a person's face for a fraction of a second, and can help determine the true feelings or emotions of a human. The fundamental characteristics of a micro-expression are involuntary leakage and fast speed through the mouth, eye movements, and eyebrows, and are often used to determine whether a person is being truthful or not. Typically, the emotional state of a person who is lying will be one of distress, characterized by the eyebrows being drawn upwards towards the idle of the forehead, causing short lines to appear across the skin of the forehead, and tensing and pursing of the lips, movements of eyes up and to the left or right, rapid eye blinking, etc.

The sensor(s) 126 may include image capture devices (such as cameras), microphones, inertial measurement units, accelerometers, compasses, GPS units, radio devices, and/or gyros. For example, the sensor(s) 126 may include a pair of rearward facing cameras mounted to the frame structure 102 for tracking the physical facial reactions of the end user 50, including the attitude of the mouth, facial wrinkles, including crow's feet around the eyes, eyebrow angle, and elapsed time between eye movements. Movement, blinking, and depth of focus of the eyes 52 of the end user 50 can be discerned by projecting light at the eyes 52, and detecting the return or reflection of at least some of that projected light. Further details discussing eye tracking devices are provided in U.S. Patent Application Ser. No. 61/801,219, entitled "Display System and Method," U.S. Patent Application Ser. No. 62/005,834, entitled "Methods and System for Creating Focal Planes in Virtual and Augmented Reality," and U.S. Patent Application Ser. No. 61/776,771, entitled "System and Method for Augmented and Virtual Reality," which are expressly incorporated herein by reference. The sensor(s) 126 may include accelerometers mounted to the relevant body part of the end user 50 for tracking the frequency and/or location of hand movements, frequency and/or location of body twitches, and shoulder hunches. The sensor(s) 126 may include conventional vital sign sensors for sensing the respiration rate, heart rate, body temperature, and blood pressure of the end user 50.

The augmented reality system 100 comprises an emotional state determination module 128 configured for determining the emotional state of the end user 50 based on the biometric data generated by the sensor(s) 126, and in particular, interpreting the generated biometric data as a specific emotional state. To assist the emotional state determination module 128, the augmented reality system 100, in the illustrated embodiment, further comprises an emotional state database 130 configured for storing an emotional state profile for the end user 50, which correlates reference biometric data for the relevant biometric parameters sensed by the sensor(s) 126 to one or more emotional states. In the illustrated embodiment, the emotional state determination module 128 interprets the biometric data generated by the sensor(s) 126 as a specific emotional state of interest by comparing the currently generated biometric data to the reference biometric data that has been correlated to the specific emotional state of interest in the emotional state profile of the end user 50, e.g., using a pattern recognition analysis.

For example, for the emotion of joy, reference biometric data (e.g., biometric data related to the attitude of the mouth of the end user 50 and the crow's feet around the eyes 52 of the end user 50) known to indicate happiness by the particular end user 50 may be stored in the emotional state database 130. Reference biometric data correlated to other emotional states of the end user 50 may also be stored in the emotional state database 130. Thus, the emotional state determination module 128 may compare the currently generated biometric data to the corresponding reference biometric data stored in the emotional state database 130, and determine that the end user 50 is in the emotional state correlated to this reference biometric data if there is a match, and determining that the end user 50 is not in this emotional state if there is not a match.

As will be described in further detail below, the emotional state profile can be customized to the end user 50 over time, e.g., during a training session in which several different types of stimuli can be presented to the end user 50 and biometric parameters relevant to the emotional states of interest can be sensed in order to learn the biometric data unique to the emotional states experienced by the end user 50. Thus, as biometric data is gathered over time, an emotional state profile is built up for the end user 50, which matches his or her personal and individual bodily expressions to the likely emotional state that is reflected by them, thus progressively enabling more accurate analysis of the emotional states for the end user 50. The custom emotional state profile can be used to determine what emotional state the end user 50 is in response to any stimulus. For example, the custom emotional state profile may be built up as the end user 50 is playing a video game, and then subsequently used to determine the emotional state of the end user 50 when playing a completely different video game or even in response to non-video game stimuli.

In addition to using biometric data, the emotional state determination module 126 may use non-biometric data to aid in determining the emotional state of the end user 50 in response to the stimuli. For example, the duration that the end user 50 interacts with the three-dimensional environment (e.g., the period of time or the number of times the stimuli is presented to the end user) may be tracked while the stimuli is presented to the end user 50. If the end user 50 is playing the video game for a long time, the biometric data generated during this time is a very good indication that the emotional state of the end user 50 happiness. This biometric data can then be stored in the custom emotional state profile and correlated to an emotional state of happiness. In contrast, if the end user 50 plays the video game for a short time, the biometric data generated during this time is a very good indication that the emotional state of the end user 50 is boredom. This biometric data can then be ignored, or even stored in the custom emotional state profile and correlated to an emotional state of boredom.

It should be appreciated that multiple biometric parameters may need to be sensed in order for the pattern recognition analysis of the generated biometric data to reveal a specific emotional state. For example, it is known that a person who experiences happiness will smile. It is also known that a person that is not experiencing happiness may fake a smile. However, a person who is truly experiencing happiness will have crow's feet around the eyes. Thus, if the biometric data obtained from the sensor(s) 126 indicates that the end user 50 is smiling and has crow's feet, the emotional state determination module 128 may determine that the end user 50 is, in fact, experiencing happiness. However, if the biometric data obtained from the sensor(s) 126 indicates that the end user 50 is smiling, but does not have crow's feet, the emotional state determination module 128 may determine that the end user 50 is, in fact, not experiencing happiness.

The manner in which the emotional state determination module 128 compares the currently generated biometric data to the reference biometric data will depend on the nature of the biometric data.

If the currently generated data for a particular biometric parameter takes the form of a scalar data value, the reference biometric data corresponding to that particular biometric parameter may take the form of one or more value ranges. For example, if the biometric parameter is the attitude of the mouth of the end user 50, and happiness is the relevant emotional state, the value range may be a distance range corresponding to the how much the corners of the mouth must be upturned in millimeters to indicate a smile for the end user 50 when known to be happy. Multiple distance ranges, indicating the extent of a smile, may be used. For example, a distance range of 5-10 mm may indicate a slight smile, a distance range of 10-20 mm may indicate a medium smile, and a range of greater than 20 mm may indicate a full smile. The currently generated biometric data value may then be compared to the reference biometric value range(s) for that particular biometric parameter by determining if biometric data value falls within the reference biometric value range, or if there are multiple reference metrical value ranges, which range the biometric data value falls in to, if any. Thus, whether or not the biometric data value falls within a particular reference biometric value range will dictate, at least in part, a match between the currently generated biometric data and the reference biometric data.

If the currently generated data for a particular biometric parameter takes the form of a multi-dimensional data vector (e.g., image data), the reference biometric data corresponding to that particular biometric parameter may take the form of a multi-dimensional array of data and one or more correlation data ranges. For example, if the biometric parameter is the crow's feet around the eyes of the end user 50, and happiness is the relevant emotional state, the pertinent portion of the reference data array coinciding with the crow's feet may comprise image data of the end user 50 when known to be happy. The currently generated biometric data vector may then be compared to the reference data array using a suitable data array comparison function, such as a Pearson Correlation Coefficient function or a least squares based function, which yields a coefficient (e.g., in the range of −1 to 1). This coefficient can then be compared to the reference correlation data range to determine whether it falls within the reference correlation range. Multiple coefficient ranges, indicating the extent of a crow's feet, may be used, in which case, the coefficient can be compared to the multiple reference correlation data ranges to determine which range the coefficient falls into, if any. For example, a coefficient of 0.5-0.7 may indicate slight crow's feet, a coefficient of 0.7-0.85 may indicate medium crow's feet, and a coefficient greater than 0.85 may indicate full crow's feet. Thus, whether or not the coefficient falls within a particular reference correlation data range will dictate, at least in part, a match between the currently generated biometric data and the reference biometric data.

If multiple biometric parameters are used to determine whether or not the end user 50 is in a specific emotional state, a function of the comparisons between the currently generated biometric data and the respective reference biometric data for the respective biometric parameters can be used by the emotional state determination module 128 to determine whether the end user 50 is in the corresponding emotional state. In this case, the currently generated data for the multiple biometric parameters may take the form of a one-dimensional array (e.g., a feature vector). For example, one scalar element in the feature vector may be a smile biological parameter, and another scalar element in the feature vector may be a crow's feet biological parameter.

In one example, the currently generated biometric data must match the reference biometric data for all of the relevant biometric parameters (e.g., the currently generated data value must fall within a reference data range for each of the relevant biometric parameters) to trigger a determination that the end user 50 is in the corresponding emotional state. In another example, the currently generated biometric data must match the reference biometric data for only a majority of the relevant biometric parameters (e.g., the currently generated data value must fall within a reference data range for each of a majority of the relevant biometric parameters) to trigger a determination that the end user 50 is in the corresponding emotional state. The extent to which generated biometric data for a particular biometric parameter matches the respective reference biometric data may depend on various factors, including the extent to which the generated biometric data for other biometric parameters matches the respective reference biometric data. Classification techniques of pattern recognition may be used to determine if a particular set of biometric data obtained from a user matches one or more reference biometric data sets corresponding to one or more emotional states. Examples, of pattern recognition classifiers, include, by way of nonlimiting example Gaussian mixture models and artificial neural networks. Furthermore, each relevant biometric parameter for a particular emotional state may be weighted relative to other relevant biometric parameters for this emotional state.

For example, the existence of crow's feet may be weighted higher than the existence of a smile when determining the emotional state of happiness. For example, if the coefficient resulting from the comparison of a currently generated biometric data vector and a reference data array indicative of crow's feet falls within the middle or highest range (e.g., greater than 0.70), then a match between the currently generated biometric data indicative of a smile and the reference biometric data may occur if the currently generated biometric value indicative of a smile falls within any of the reference data ranges (e.g., value greater than 5 mm), thereby triggering a determination that the emotional state is happiness. In contrast, if the coefficient resulting from the comparison of a currently generated biometric data vector and a reference data array indicative of crow's feet falls within the lowest range (e.g., greater than 0.5-0.7), then a match between the currently generated biometric data indicative of a smile and the reference biometric data may only occur if the currently generated biometric value indicative of a smile falls within the highest reference data range (e.g., value greater than 20 mm), thereby triggering a determination that the emotional state is happiness.

The augmented reality system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the augmented reality system 100 comprises a central processing unit (CPU) 132, a graphics processing unit (GPU) 134, and one or more frame buffers 136. The CPU 132 controls overall operation, while the GPU 134 renders frames (i.e., translating a three-dimensional environment into a left and right eye imagery) from three-dimensional data stored in the remote data repository 150 and stores these frames in the frame buffer(s) 136. While not illustrated, one or more additional integrated circuits may control the reading into and/or reading out of frames from the frame buffer(s) 136 and operation of the scanning device of the display system 104. Reading into and/or out of the frame buffer(s) 146 may employ dynamic addressing, for instance, where frames are over-rendered. The augmented reality system 100 further comprises a read only memory (ROM) 138 and a random access memory (RAM) 140. The augmented reality system 100 further comprises a three-dimensional data base 142 from which the GPU 134 can access three-dimensional data of one or more scenes for rendering frames.

Significant to the present inventions, the CPU 132 instructs the display system 104 and/or speaker 106 to present the afore-mentioned stimuli to the end user 50 in the context of the three-dimensional environment, and performs a subsequent action discernible to the end user 50 in response to the determined emotional state in accordance with the current objective of the augmented reality system 100.

In one embodiment, the current objective of the augmented reality system 100 may be to evoke a desired emotional state in the end user 50 for a desired duration. In another embodiment, the current objective of the augmented reality system 100 may be to not evoke an undesired emotional state in the end user 50 for a desired duration. In still another embodiment, the current objective of the augmented reality system 100 may be to evoke a plurality of different desired emotional states in the end user 50 for a desired duration. The desired duration may be, e.g., one time in a relevant period of time, a plurality of times in a relevant period of time, or continuously over a relevant period of time. For example, the current objective of the augmented reality system 100 may be to evoke happiness in the end user 50 one time in a relevant period of time, evoke happiness in the end user 50 several times in a relevant period of time, or continuously evoke happiness in the end user 50 over a relevant period of time. Or, the current objective of the augmented reality system 100 may be to not evoke boredom in the end user 50 even for one time in a relevant period of time, not evoke boredom in the end user 50 several times in a relevant period of time, or not continuously evoke boredom in the end user 50 over the relevant period of time. Or, the current objective of the augmented reality system 100 may be to alternately evoke happiness and surprise in the end user 50 in a relevant period of time.

The action performed by the augmented reality system 100 will depend on whether the end user 50 is determined to be or not be in the relevant emotional state, and whether this relevant emotional state is consistent with the current objective of the augmented reality system 100.

For example, if the end user 50 is determined to be in a specific emotional state (e.g., happiness or surprise) for the desired duration (e.g., the end user 50 is determined to be happy or surprised several times in the relevant period of time), which specific emotional state is consistent with the desired emotional state (e.g., happiness or surprise), the action performed by the augmented reality system 100 may be to subsequently make the stimulus that evoked this emotional state more available to the end user 50. In contrast, if the end user 50 is determined to not be in this specific emotional state for the desired duration (e.g., the end user 50 is determined to not be happy or surprised several times in the relevant period of time), the action performed by the augmented reality system 100 may be to subsequently make the stimulus that did not evoke this emotional state less available to the end user 50.

As another example, if the end user 50 is determined to not be in a specific emotional state (e.g., sadness or frustration) for the desired duration (e.g., the end user 50 is determined to not be sad or frustrated at any time in the relevant period of time), which specific emotional state is consistent with the undesired emotional state (e.g., sadness or frustration), the action performed by the augmented reality system 100 may be to subsequently make the stimulus that evoked this emotional state more available to the end user 50. In contrast, if the end user 50 is determined to be in this specific emotional state for the desired duration (e.g., the end user 50 is determined to be sad or frustrated at least one time in the relevant period of time), the action performed by the augmented reality system 100 may be to subsequently make the stimulus that did not evoke this emotional state less available to the end user 50.

As still another example, if the end user 50 is determined to be in a plurality of different emotional states (e.g., alternating happiness and surprise) for the desired duration (e.g., several times for each of these emotional states for the relevant period of time), which different emotional states are consistent with the desired emotional states (e.g. alternating happiness and surprise), the action performed by the augmented reality system 100 may be to subsequently make the stimulus that evoked this emotional state more available to the end user 50. In contrast, if the end user 50 is determined to not be in these different emotional states for the desired duration, the action performed by the augmented reality system 100 may be to subsequently make the stimulus that did not evoke this emotional state less available to the end user 50.

Thus, stimuli, such as video games, programs, background music, rewards, alerts, features thereof, etc., may be optimized, thereby promoting increased use of the augmented reality system 100.

For example, assume that the current objective of the augmented reality system 100 is to maximize the happiness of the end user 50 with respect to video games. If, in response to a stimulus presented in the form of a video game, the emotional state of the end user 50 is determined to be happiness or excitement a sufficient number of times during a relevant portion of the video game, then the subsequent action performed by the CPU 132 may be to subsequently make the video game more available to the end user 50, e.g., by subsequently presenting the same video game to the end user 50 or otherwise maintaining the video game at the top of a video game selection menu structure (e.g., by putting the video game in a favorite's list). In contrast, if the emotional state of the end user 50 is determined to be frustration or boredom in a single instance during the relevant portion of the video game, then the subsequent action performed by the CPU 132 may be to subsequently make the video game less available to the end user 50, e.g., by subsequently presenting a different video game to the end user 50 or otherwise burying the video game deeper in a video game selection menu structure.

In a similar manner, assume that the current objective of the augmented reality system 100 is to maximize the happiness of the end user 50 with respect to a specific video game. If, in response a stimulus presented in the form of a feature of the video game, the emotional state of the end user 50 is determined to be happiness or excitement continuously during presentation of the feature, then the subsequent action performed by the CPU 132 may be to subsequently make the feature of this video game more available to the end user 50, e.g., by subsequently presenting the same feature to the end user 50 or otherwise increasing the probability that this same feature will be presented to the end user 50 during the video game. In contrast, if the emotional state of the end user 50 is determined to be frustration or boredom in a single instance during presentation of the feature, then the subsequent action performed by the CPU 132 may be to subsequently make the feature of this video game less available to the end user 50, e.g., by eliminating this feature from the video game or otherwise decreasing the probability that this same feature will be presented to the end user 50 during the video game.

Assume that the current objective of the augmented reality system 100 is to evoke desired emotional states in the end user 50 during pertinent portions of a video game by optimizing the soundtrack to the video game. The objective may be to make the end user 50 feel tense or to feel a sense of wonder, or all different types of emotions during selected portions of the video game. The tempo, pitch, rhythm, instrumentation, whether or not to include a particular instrument (e.g., guitar), sound of a particular instrument (e.g., drum beat), the order in which segments are played, etc. may be optimized. For example, if, in response to a stimulus presented in the form of a soundtrack, the emotional state of the end user 50 is determined to be excitement during a portion of the video game where excitement in the end user 50 is intended, the CPU 132 may maintain this portion of the soundtrack as is the next time the end user 50 encounters this portion of the video game. In contrast, if the emotional state of the end user 50 is determined to be boredom during that portion of the video game, the CPU 132 may modify that portion of the soundtrack the next time the end user 50 encounter this portion of the video game. As this process happens over and over again, subtle changes are introduced into how the soundtrack is played during the video game. The changes in the soundtrack and corresponding emotional states of the end user 50 may be tracked, such that the changes in the soundtrack are gradually optimized for the best match between the actual emotional state of the end user 50 and the desired emotional state of the end user 50 during the video game.

Assume that the current objective of the augmented reality system 100 is to maximize the happiness of the end user 50 with respect to reward given for a successful outcome as a result of the end user 50 interacting with a video game. If, in response to a stimulus presented in the form of an animated reward, the emotional state of the end user 50 is determined to be happiness in a single instance, then the CPU 132 may subsequently make the same animation more available to the end user 50, e.g., by presenting the same animation to the end user 50 or otherwise increasing the possibility that the same animation will be presented to the end user 50 in response to the next successful outcome in interacting with video game. In contrast, if the emotional state of the end user 50 is determined to be frustration or boredom in a single instance, then the CPU 132 may subsequently make the same animation less available to the end user 50, e.g., by presenting a different animation as a reward or otherwise decreasing the possibility that the same reward will be presented to the end user 50 in response to the next successful outcome in interacting with the video game. In this manner, the reward may be optimized by modifying it until the end user 50 experiences maximum happiness when given rewards.

Assume that the current objective of the augmented reality system 100 is to maximize happiness or relaxation with respect to background music. Since music is a matter of taste, reactions to different music will vary; a piece of music can elicit different emotions from various listeners. If, in response to a stimulus presented in the form of a particular musical piece, the emotional state of the end user 50 is determined to be happiness or relaxation continuously during the musical piece, then the CPU 132 may subsequently make that musical piece more available to the end user 50, e.g., by including that musical piece in a list that is played in rotation. The CPU 132 may even include musical pieces in the list in the same genre as the musical piece that made the end user 50 happy or relaxed. For example, if the musical piece was classical, then the CPU 132 may include other classical music in the list. In contrast, if the emotional state of the end user 50 is determined to be sadness, frustration, or boredom in a single instance, then the CPU 132 may subsequently make that musical piece less available to the end user 50, e.g., by excluding that musical piece form the at least that is played in rotation. The CPU 132 may even exclude musical pieces from the list in the same genre as the musical piece that made the end user 50 sad, frustrated, or bored. For example, if the musical piece was rock, then the CPU 132 may exclude all rock from the list.

Assume that the current objective of the augmented reality system 100 is to evoke a variety of vastly different emotions in the end user 50 with respect to a movie. If, in response to a stimulus in the form of a particular comedy/suspense movie, the end user 50 is determined to experience a range of different emotions from happiness to sadness to surprise, then the CPU 130 may subsequently make that movie or similar movies more available to the end user 50. In contrast, if the end user 50 is determined to not experience a range of different emotions, but rather experiences boredom, then the CPU 130 may subsequently make that movie or similar movies less available to the end user 50, and may even present a completely different movie to the end user 50.

Thus, the CPU 132 may automatically present to the end user 50 of what is liked and less of what is not liked. The CPU 132 hides a "non-pleasing" experience from the "non-pleased" end user 50, and makes other experiences more available to the end user 50 according to how these experiences please him or her.

The current objective of the augmented reality system 100 may not be limited to evoking emotional states that provide the end user 50 with a more pleasurable experience when interacting with the three-dimensional environment. For example, the current objective of the augmented reality system 100 may be to quickly get the end user 50 to a state of attention via an alert signal. If, in response to a stimulus in the form of a particular alert signal (such as a blinking light), the end user 50 quickly becomes attentive, then the CPU 130 may subsequently make the same alert signal more available to the end user 50, e.g., by subsequently presenting the blinking light to the end user 50 or otherwise increasing the possibility that the blinking light will be presented to the end user 50 each time it is desired to alert the end user 50. In contrast, if the end user 50 does not become quickly attentive or does not become attentive at all, then the CPU 130 may subsequently make the same alert signal less available to the end user 50, e.g., by subsequently presenting a different alert signal (e.g., a whooping sound) or otherwise decreasing the possibility that the blinking light will be presented to the end user 50 the next time it is desired to alert the end user 50.

The current objective of the augmented reality system 100 is not limited to evoking one or more specific emotional states in the end user 50 when interacting with the three-dimensional environment. For example, the current objective of the augmented reality system 100 may be to beat the end user 50 at a strategy video game, e.g., a video poker game having one or more simulated players that play against the end user 50. During the video poker game, e.g., right after the cards are initially dealt to the end user 50 and simulated players, the specific emotional state of the end user 50 may be determined, and the CPU 130 may make a game move using the specific emotional state determination against the end user 50. In this case, the specific emotional state of the end user 50 that is determined is one that indicates whether or not the end user 50 is bluffing, and the game move made by the CPU 130 is playing cards against the end user 50 using the determination of whether or not the end user 50 is bluffing against the end user 50. Thus, the simulated players have the advantage of sensing when the end user 50 is bluffing. By interacting with the poker game simulator, the end user 50 will learn to have a more convincing "poker face" when playing an actual poker game.

The current objective of the augmented reality system 100 may be as simple as attempting to determine whether the end user 50 is lying. For example, if, in response to a stimulus in the form of a question, it is determined that the end user 50 is experiencing an emotional state that indicates that the end user 50 is lying, the CPU 132 may inform the end user 50 that he or she is lying. In contrast, if it is determined that the end user 50 is experiencing an emotional state that indicates that the end user 50 is being truthful, the CPU 132 will inform the end user 50 that he or she is telling the truth. As a game or a training device, the end user 50 may intentionally lie in an attempt to fool the lie detector.

Assume that the current objective of the augmented reality system 100 is determine which one of a plurality of objects the end user 50 is thinking of. For example, if, in response to a stimulus in the form of presenting various objects, such as several playing cards, it is determined that the end user 50 is experiencing an emotional state that indicates that the end user 50 is focusing on a particular playing card, the CPU 132 will inform the end user 50 which playing card the end user 50 is thinking about, e.g., the queen of hearts.

Assume that the current objective of the augmented reality system 100 is to make the end user 50 laugh as in a "stare-until-laughing" game. If, in response to a stimulus in the form of displaying an object that is likely to evoke laughter from the end user 50, such as a funny face, the emotional state of the end user 50 is determined to be one "tending towards" laughing, the CPU 132 may modify the funny face to maximize the signs of impending laughter until the end user 50 experiences a full smile or laughter. The CPU 132 may modify the funny face in any variety of manners to test when the end user 50 tends towards laughter.

Figure 3A:
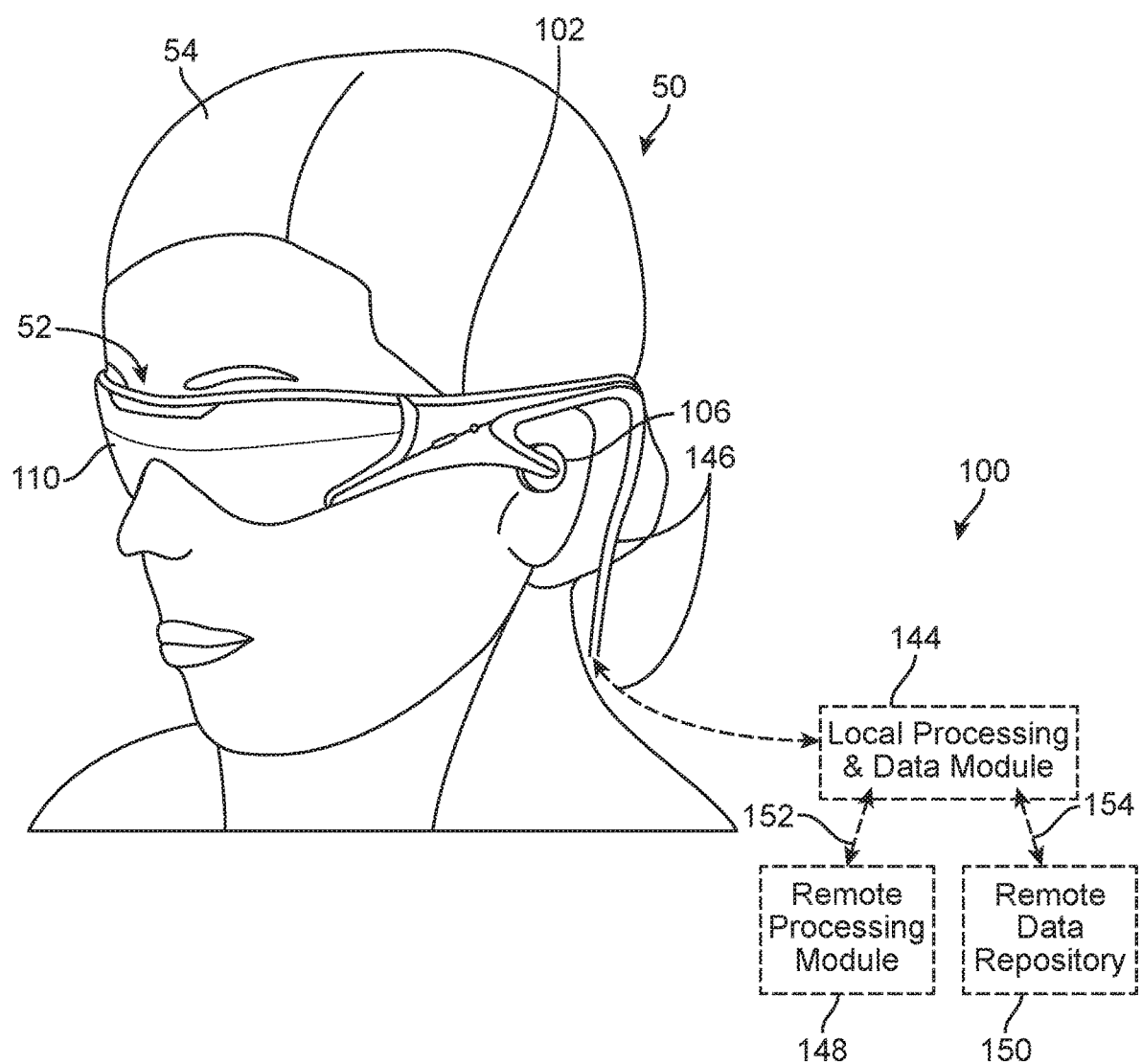
FIG. 3a is a view of one technique that can be used to wear the augmented reality system of FIG. 2.
Figure 3B:
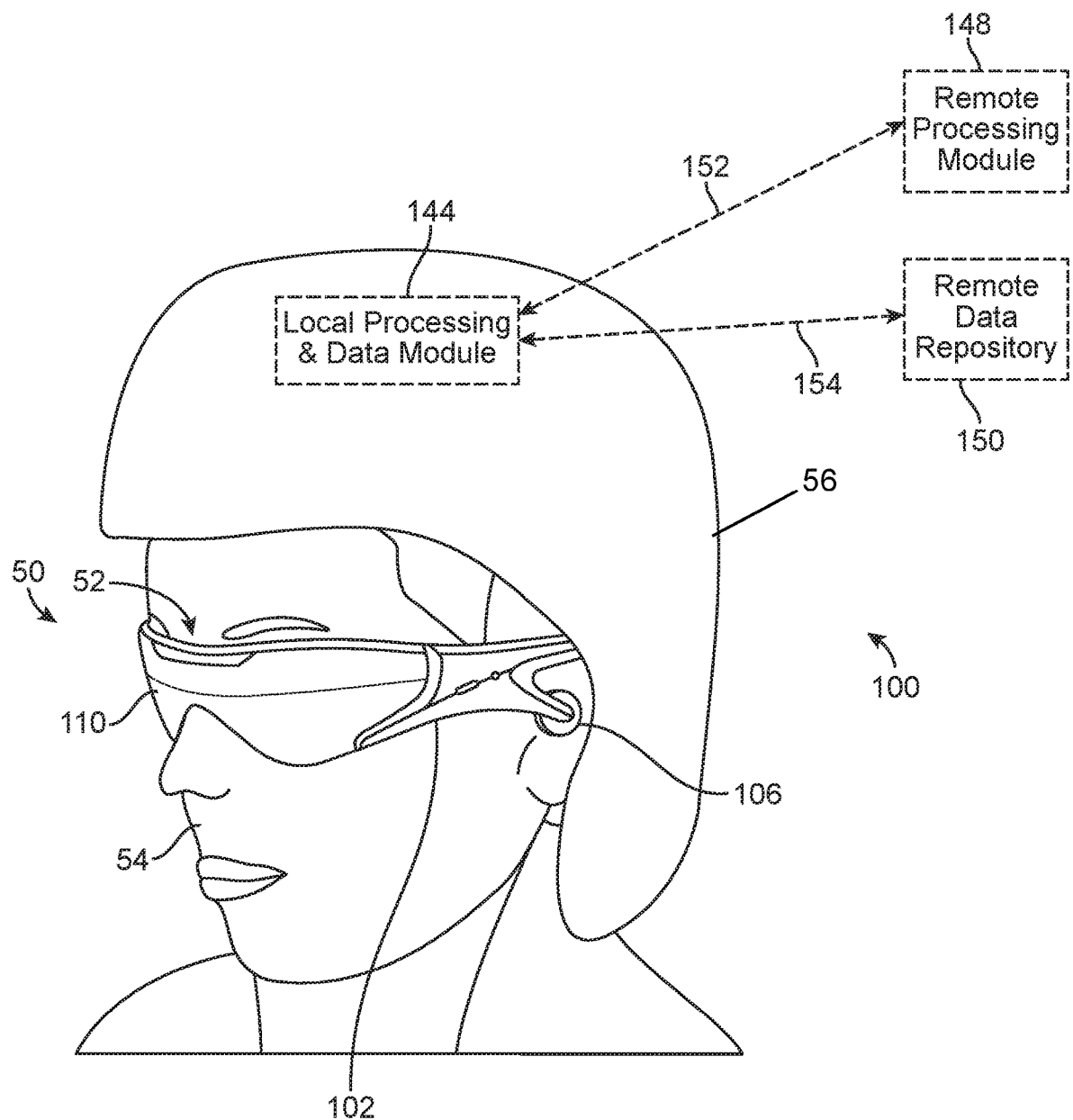
FIG. 3b is a view of another technique that can be used to wear the augmented reality system of FIG. 2.
Figure 3C:
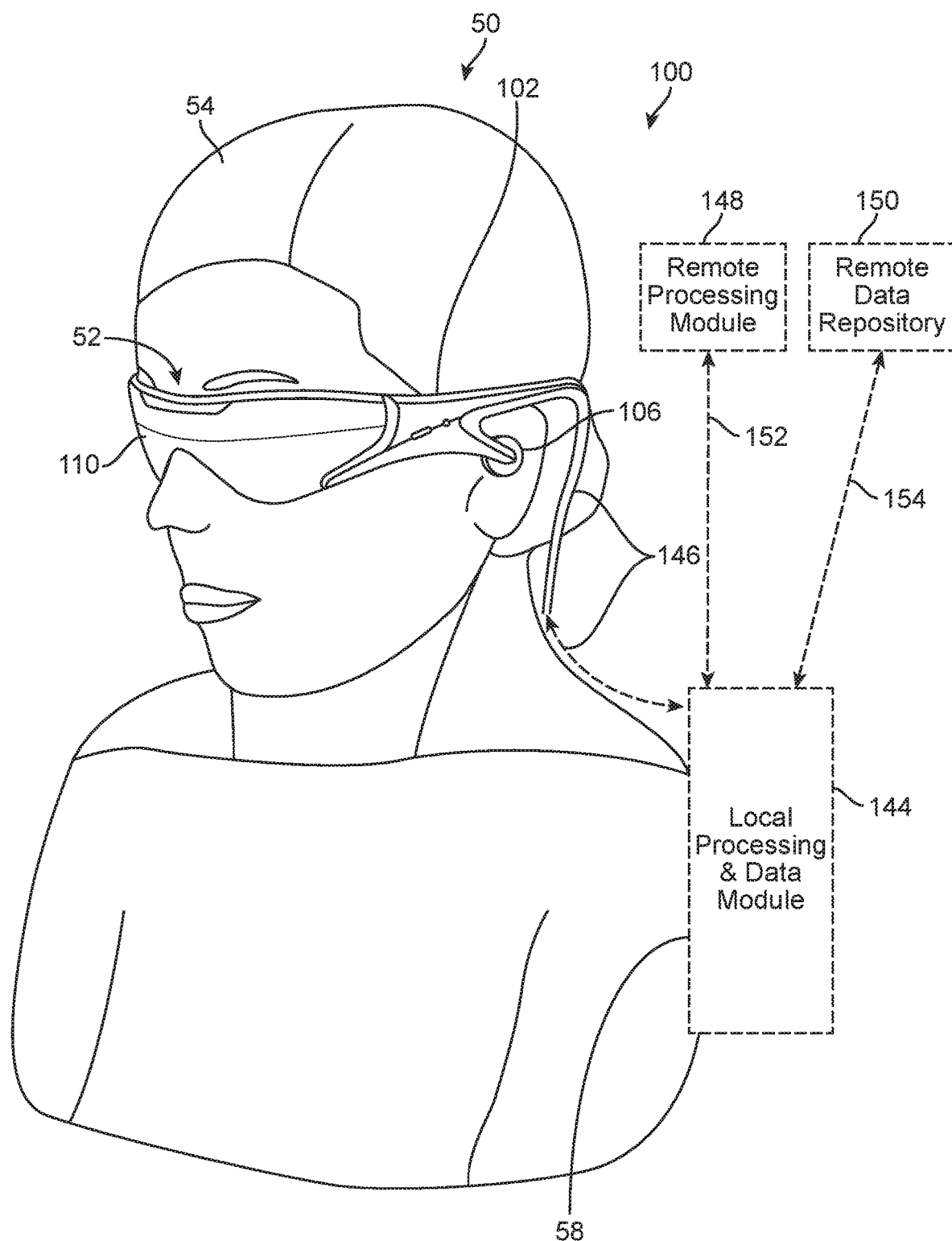
FIG. 3c is a view of still another one technique that can be used to wear the augmented reality system of FIG. 2.
Figure 3D:
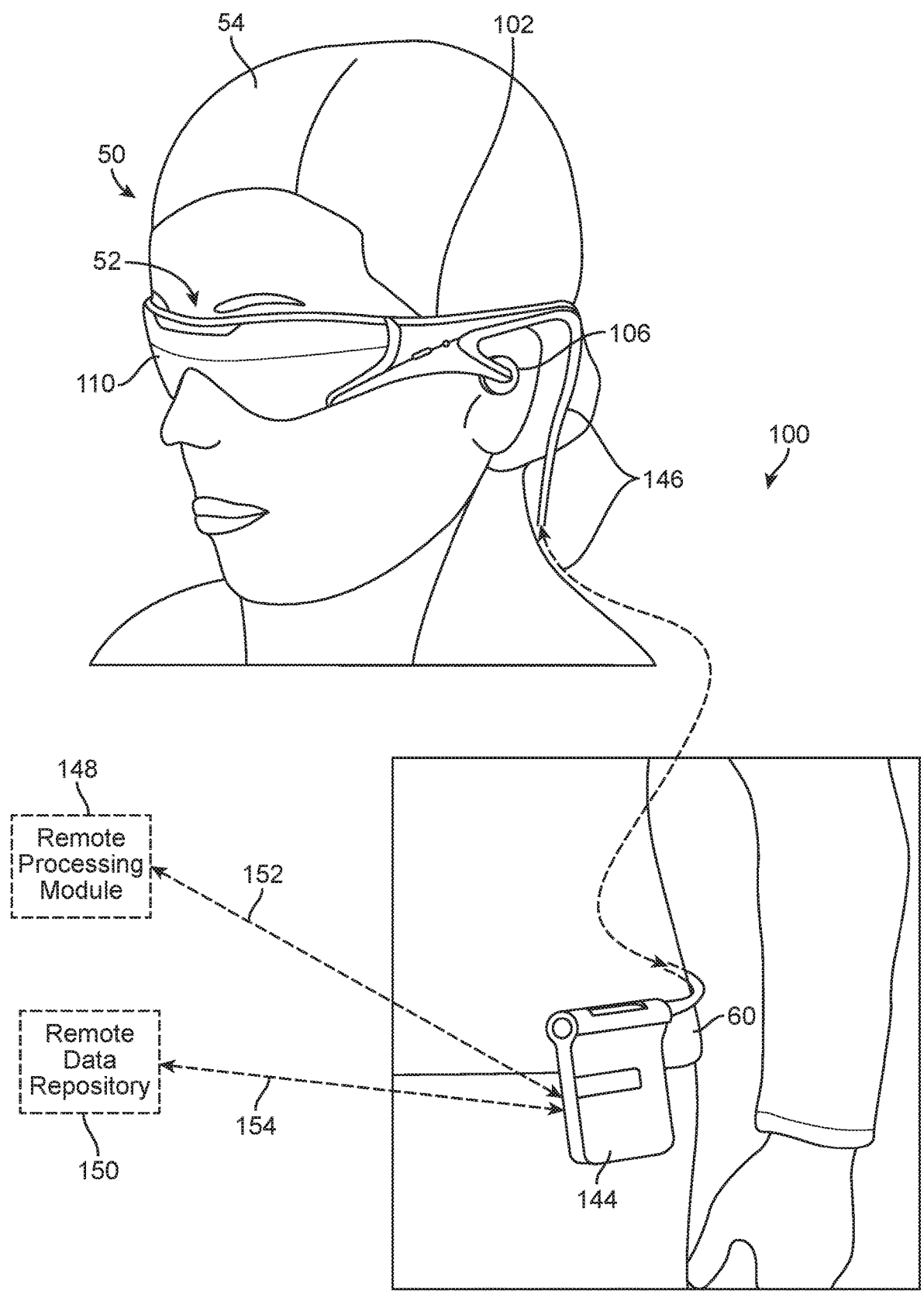
FIG. 3d is a view of yet another one technique that can be used to wear the augmented reality system of FIG. 2.

The various processing components of the augmented reality system 100 may be physically contained in a distributed system. For example, as illustrated in FIGS. 3a-3d, the augmented reality system 100 comprises a local processing and data module 144 operatively coupled, such as by a wired lead or wireless connectivity 146, to the display system 104 and sensors. The local processing and data module 144 may be mounted in a variety of configurations, such as fixedly attached to the frame structure 102 (FIG. 3a), fixedly attached to a helmet or hat 56 (FIG. 3b), embedded in headphones, removably attached to the torso 58 of the end user 50 (FIG. 3c), or removably attached to the hip 60 of the end user 50 in a belt-coupling style configuration (FIG. 3d). The augmented reality system 100 further comprises a remote processing module 148 and remote data repository 150 operatively coupled, such as by a wired lead or wireless connectivity 150, 152, to the local processing and data module 144, such that these remote modules 148, 150 are operatively coupled to each other and available as resources to the local processing and data module 144.

The local processing and data module 144 may comprise a power-efficient processor or controller, as well as digital memory, such as flash memory, both of which may be utilized to assist in the processing, caching, and storage of data captured from the sensors and/or acquired and/or processed using the remote processing module 148 and/or remote data repository 150, possibly for passage to the display system 104 after such processing or retrieval. The remote processing module 148 may comprise one or more relatively powerful processors or controllers configured to analyze and process data and/or image information. The remote data repository 150 may comprise a relatively large-scale digital data storage facility, which may be available through the internet or other networking configuration in a "cloud" resource configuration. In one embodiment, all data is stored and all computation is performed in the local processing and data module 144, allowing fully autonomous use from any remote modules.

The couplings 146, 152, 154 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 3a-3d. Thus, the particular choice of wired or wireless communications should not be considered limiting.

In the illustrated embodiment, the emotional state determination module 128 and emotional state emotional state database 130 are contained in the local processing and data module 144, while the CPU 132 and GPU 134 are contained in the remote processing module 148, although in alternative embodiments, the CPU 132, GPU 124, or portions thereof may be contained in the local processing and data module 144. The 3D database 142 can be associated with the remote data repository 150.

Figure 4:
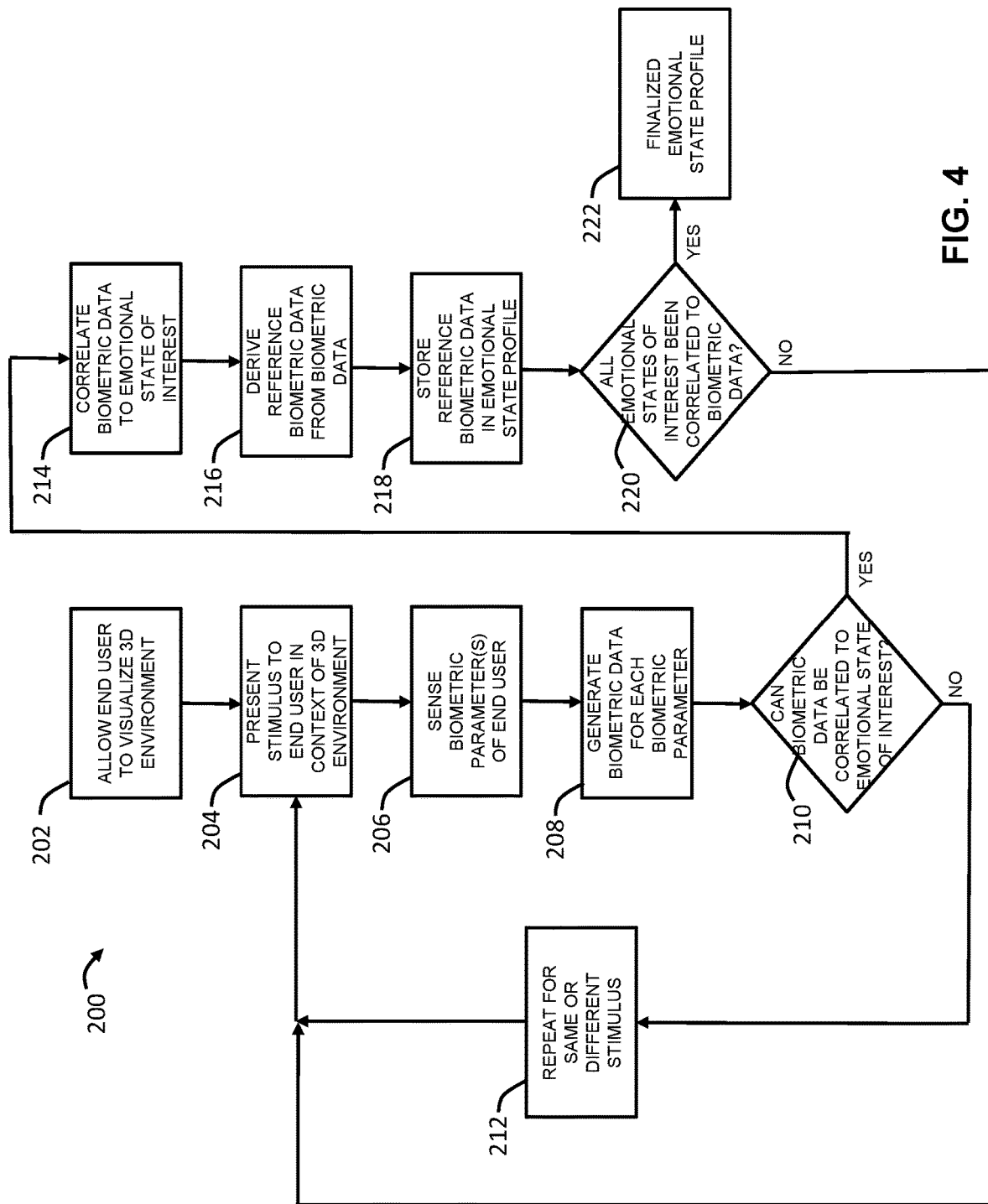
FIG. 4 is a flow diagram illustrating a method of operating the augmented reality system of FIG. 2 to generate a custom emotional state profile for an end user.

Having described the structure and function of the augmented reality system 100, one method 200 performed by the augmented reality system 100 to build a custom emotional profile for an end user 50 will now be described with respect to FIG. 4. First, the augmented reality system 100 allows the end user 50 to visualize the three-dimensional environment include both real objects and virtual objects (step 202), e.g., using a video see-through approach or optical see-through approach. Of course, in the case where a virtual reality system, instead of the augmented reality system 100, is used, the entire three-dimensional environment will consist of only virtual objects.

Next, the augmented reality system 100 directs the display system 104 and/or speaker 106 to visually and/or aurally present a stimulus to the end user 50 in the context of the three-dimensional environment (step 204). As described above, the stimulus can be any stimulus that may evoke a physical reaction in the end user 50, e.g., a video game, program, musical background piece, reward, virtual object, or alert, or any feature thereof, and may be presented to the end user 50 as a portion of the three-dimensional environment or in the background of the three-dimensional environment (e.g., as a reward or penalty), or may be the entirety of the three-dimensional environment, such as video game or movie.

Next, the sensor(s) 126 sense at least one biometric parameter of the end user 50 in response to the presented stimulus (step 206). As discussed above, each biometric parameter may take the form of any parameter related to a physical reaction indicative of the end user's 50 emotional state. The sensor(s) 126 then generate biometric data for each of the sensed biometric parameter(s) (step 208). As also discussed above, the biometric data may, e.g., take the form of one or more values. For example, the biometric data may be a single scalar data value or a multi-dimensional data vector.

The emotional state determination module 128 then determines whether the generated biometric data can be correlated to an emotional state of interest with a particular confidence level (e.g., 95 percent confidence), e.g., using a pattern recognition analysis (step 210).

If the generated biometric data cannot be correlated to the emotional state of interest with a particular confidence level, steps 204-210 are then repeated for the same stimulus or for different stimuli (step 212) until the generated biometric data is correlated to the emotional state of interest (step 214).

For example, the same stimulus can be repeatedly presented to the end user 50 while sensing the biometric parameter(s) and generating the biometric data. In this case, the biometric data generated for each of the sensed biometric parameters over the iterations will generally be about the same. The duration that the end user 50 interacts with the three-dimensional environment (e.g., the period of time or the number of times the stimulus is presented to the end user) may be tracked while the stimulus is presented to the end user 50, and compared to a threshold duration. If the tracked duration exceeds the threshold duration, and if the generated biometric data is indicative of the emotional state of interest, then the generated biometric data may be correlated to the emotional state of interest.

For example, if the emotional state of interest is happiness, and the end user 50 is interacting with the three-dimensional environment for a relatively long duration, it can be assumed that the end user 50 is happy with the experience provided by the stimulus if the generated biometric data indicates a smile and crow's feet on the end user 50. As such, the generated biometric data can be correlated to the emotional state of happiness.

However, if the end user 50 interacted with the three-dimensional environment for a relatively short duration, it can be assumed that the end user 50 is not happy with the experience provided by the stimulus even if the generated biometric data indicates a smile and crow's feet on the end user 50. As such, the generated biometric data is not correlated to the emotional state of happiness. Even if the end user 50 interacted with the three-dimensional environment for a relatively long duration, it can be assumed that the end user 50 is not happy, but rather frustrated, with the experience provided by the stimulus if the generated biometric data does not indicate a smile and crow's feet, but rather inward slanting eyebrows, raised chin, lips pressed together, mouth twisted to one side, and a crease on the cheek, on the end user 50. As such, the generated biometric data is not correlated to the emotional state of happiness, and in fact, may be correlated to the emotional state of frustration.

As another example, different stimuli can be repeatedly presented to the end user 50 while sensing the biometric parameter(s) and generating the biometric data in order to determine an emotional trajectory of the end user 50 based on the different emotional states or the extent of an emotional state that the end user 50 may have in response to the different stimuli. In this case, the biometric data generated for each sensed biometric parameter over the iterations will substantially differ from each other. The emotional state determination module 128 can then select the biometric data that best matches the specific emotional state that is to be correlated.

For example, music with a particular tempo may be played to the end user 50 in the background as the end user 50 is interacting with the three-dimensional environment. If the generated biometric data reflects that the end user 50 is sad, frustrated, or bored, the tempo of the music may be increased. If the generated biometric data then indicates that the end user 50 is not sad, frustrated, or bored, the tempo of the music may be further increased until the generated biometric data reflects that the end user 50 has a smile and crow's feet, indicating happiness. The tempo of the music can be incrementally increased to maximize the smile and crow's feet of the end user 50. The resulting biometric data can then be correlated to the emotional state of happiness for the end user 50. A similar technique can be used to determine the biometric data that indicates maximum happiness by the end user 50, except different types or styles of music, instead of different tempos of the same music, can be presented to the end user 50.

Once the biometric data is correlated to an emotional state of interest at step 214, then the emotional state determination module 128 derives reference biometric data from the correlated biometric data (step 216). For example, one or more reference biometric data ranges, one or more biometric data feature vectors, and/or one or more reference two-dimensional biometric data array for each sensed biometric parameter can be derived from the biometric data that has been correlated to the emotional state of interest. The reference biometric data is then stored in the emotional state profile of the emotional state database 130 in association with the emotional state of interest (step 218).

Next, the emotional state determination module 128 determines whether all emotional states of interest have been correlated to biometric data and stored in the emotional state profile (step 218). If not, steps 204-216 are repeated for another emotional state of interest (step 220). For example, if stimuli likely to evoke emotions of happiness have been previously presented to the end user 50 during steps 204-218, then a different emotional state of interest, such as sadness, frustration, or boredom can be presented to the end user 50 during steps 204-218 and stored in the emotional state profile along with the corresponding reference biometric data. Thus, the finalized emotional state profile can contain a plurality of emotional states and corresponding reference biometric data (step 222), which can be subsequently accessed by the emotional state determination module 128 to determine the emotional state of the end user 50 in response to different stimuli presented to the end user 50 in the context of any one of a variety of different three-dimensional environments. For example, even though stimuli related to playing music is presented to the end user 50 in the context of a video game to build up the emotional state profile, the emotional state profile can be accessed to determine whether the end user 50 has any of the stored emotional states in response to any one of a variety of different stimuli in the context of a movie.

Figure 5:
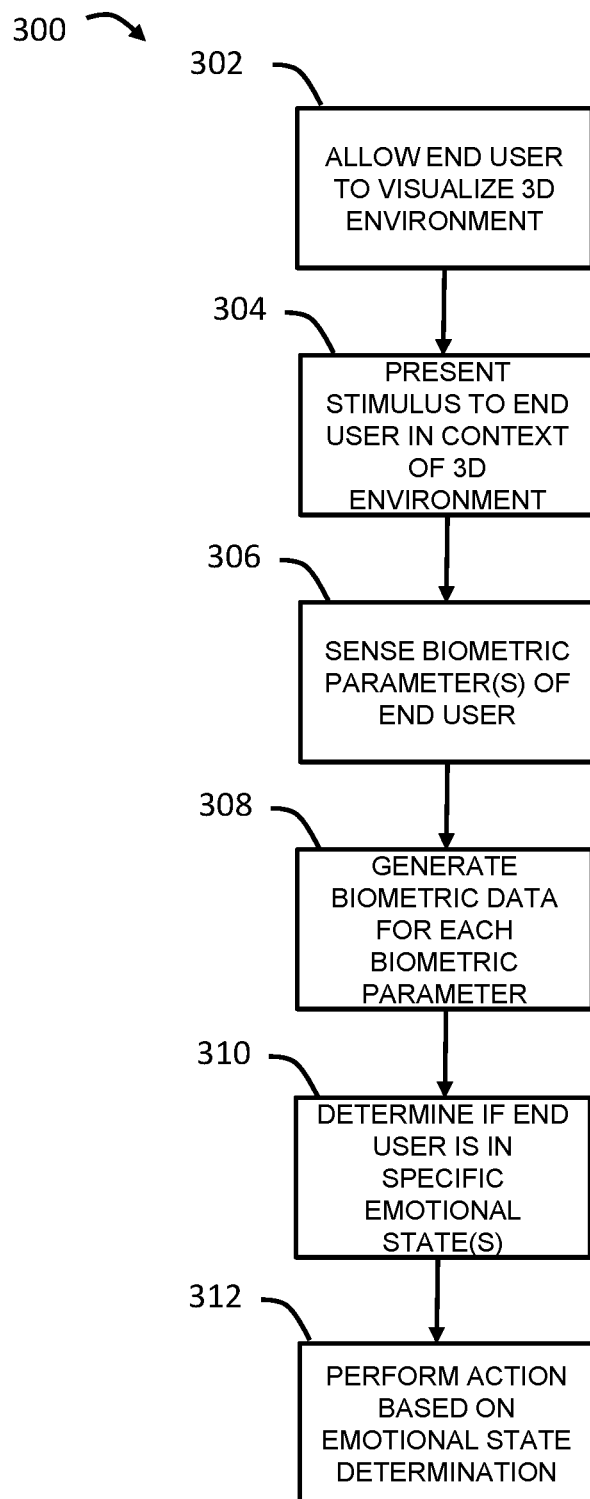
FIG. 5 is a flow diagram illustrating a method of operating the augmented reality system of FIG. 2 to perform actions based on sensing emotional states in the end user.

Referring now to FIG. 5, one method 300 of operating the augmented reality system 100 will now be described. First, the augmented reality system 100 allows the end user 50 to visualize the three-dimensional environment consisting of both real objects and virtual objects (step 302), e.g., using a video see-through approach or optical see-through approach. Of course, in the case where a virtual reality system, instead of the augmented reality system 100, is used, the entire three-dimensional environment will consist of only virtual objects.

Next, the augmented reality system 100 directs the display system 104 and/or speaker 106 to present a stimulus to the end user 50 in the context of the three-dimensional environment (step 304). As described above, the stimulus may be presented to the end user 50 as a portion of the three-dimensional environment or in the background of the three-dimensional environment (e.g., as a reward or penalty), or may be the entirety of the three-dimensional environment, such as video game or movie.

Next, the sensor(s) 126 sense at least one biometric parameter of the end user 50 in response to the presented stimulus (step 306). As discussed above, each biometric parameter may take the form of any parameter related to a physical reaction indicative of the end user's 50 emotional state. The sensor(s) 126 then generate biometric data for each of the sensed biometric parameter(s) (step 308). As also discussed above, the biometric data may, e.g., take the form of one or more values. For example, the biometric data may be a single scalar data value, one-dimensional feature vector, or a multi-dimensional data vector. Each biometric parameter may be sensed at a plurality of different times in response to the presented stimulus, in which case, the biometric data will be generated at these different times.

Next, the emotional state determination module 128 determines if the end user 50 is in at least one specific emotional state based on the generated biometric values, e.g., by performing a pattern recognition analysis on the generated biometric data (e.g., by running a classification algorithm, e.g., ANN, Gaussian Mixture evaluation, etc.) (step 310). This can be accomplished by comparing the generated biometric data to reference biometric data that has been correlated to the specific emotional state(s). For example, if the generated biometric data for one of the sensed biometric parameter(s) is a scalar data value, and the reference biometric data comprises a reference value range, the generated biometric data may be compared to the reference biometric data by determining whether the scalar data value falls within the reference biometric value range. If the generated biometric data for one of the sensed biometric parameter(s) is a biometric multi-dimensional data vector, and the reference biometric data comprises a reference multi-dimensional data vector, the generated biometric data may be compared to the reference biometric data comprises by performing a correlation function between the generated multi-dimensional data vector and the reference multi-dimensional data vector.

In performing the above comparison functions, the emotional state determination module 128 may access the custom (personalized) emotional state profile and retrieve the reference biometric data corresponding to the specific emotional state(s), compare the currently generated biometric data to the reference biometric data, and determine if there is a match between the currently generated biometric data and the reference biometric data. If there is a match, the emotional state determination module 128 determines that the end user 50 is in the specific emotional state(s), and if there is not a match, the emotional state determination module 128 determines that the end user 50 is not in the specific emotional state.

Next, the CPU 132 performs an action discernible to the end user 50 to facilitate a current objective at least partially based on if it is determined that the end user 50 is in the specific emotional state(s) (step 312). The current objective may be any one of a variety of objectives. For example, if the stimulus that evokes a physical reaction in the end user 50 is a video game, program, musical background piece, reward, virtual object, or alert, or any feature thereof, the current objective may be to evoke a desired emotional state in the end user 50 for a desired duration, or to not evoke an undesired emotional state in the end user 50 for a desired duration, or to evoke a plurality of different desired emotional states in the end user 50 for a desired duration. The desired duration can be, e.g., one time in a relevant period of time, a plurality of times in a relevant period of time, or continuously over a relevant period of time.

Assume that the current objective is to evoke a desired emotional state in the end user for a desired duration, and the specific emotional state(s) is consistent with the desired emotional state. If the end user 50 is determined to be in the specific emotional state for the desired duration, the CPU 132 will subsequently make the stimulus more available to the end user 50, and if the end user 50 is determined to not be in the specific emotional state for the desired duration, the CPU 132 will subsequently make the stimulus less available to the end user 50. In contrast, assume that the current objective is to not evoke an undesired emotional state in the end user 50 for a desired duration, and the specific emotional state(s) is consistent with the undesired emotional state. If the end user 50 is determined to not be in the specific emotional state for the desired duration, the CPU 132 will subsequently make the stimulus more available to the end user 50, and if the end user 50 is determined to be in the specific emotional state for the desired duration, the CPU 132 will subsequently make the stimulus less available to the end user 50. In further contrast, assume that the current objective is to evoke a plurality of different desired emotional states in the end user for a desired duration, and the specific emotional state(s) is consistent with the plurality of desired emotional states. If the end user 50 is determined to be in the plurality of different emotional states for the desired duration, the CPU 132 will subsequently make the stimulus more available to the end user 50, and if the end user 50 is determined to not be in the plurality of different emotional states for the desired duration, the CPU 132 will subsequently make the stimulus less available to the end user 50.

Of course, the current objective may be different from evoking or not evoking desired or undesired emotional states in the end user 50. For example, if the stimulus takes the form of a strategy video game, and the current objective is to beat the end user at the strategy video game, the CPU may subsequently make a game move using the specific emotional state determination against the end user 50. For example, if the strategy video game is a playing card video game having one or more simulated players that play against the end user, the specific emotional state may be one that indicates whether or not the end user is bluffing, in which case, the simulated players may play cards against the end user 50 using knowledge as to whether or not the end user 50 is bluffing. As another example, if the stimulus takes the form of a question presented to the end user 50, and the current objective is to determine whether or not the end user is lying in response to the question, the CPU 132 may subsequently inform the end user 50 whether or not the end user 50 is lying using the specific emotional state determination. As still another example, if the stimulus takes the form of a plurality of options presented to the end user 50, and the current objective is to determine which one of the objects the end user 50 is thinking of, the CPU 132 may subsequently inform the end user 50 which object the end user 50 is thinking of using the specific emotional state determination. As yet another example, if the stimulus takes the form of a simulated face, and the current objective is to make the end user 50 laugh, the CPU 132 may subsequently determine if the end user 50 is about to laugh using the specific emotional state determination, and modify the simulated face to make the end user 50 laugh.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of operating an augmented reality (AR) display system that includes a wearable display device, the method comprising:
   presenting an interactive three-dimensional environment to a user through the wearable display device, the interactive three-dimensional environment comprising a real-world scene and at least one virtual object that is generated by the AR display system and presented within the real-world scene;
   responsive to presenting a stimulus in the three-dimensional environment, sensing at least one biometric parameter of the user, the at least one biometric parameter sensed using at least one sensor that is attached to the wearable display device;
   generating biometric data for each of the at least one sensed biometric parameter;
   determining at least one emotional state of the user based on the biometric data for the each of the at least one sensed biometric parameter; and
   performing an action through the AR display system based at least partly on determining that the user is in the at least one emotional state, wherein the action includes a modification of the at least one virtual object while it is being presented to the user through the wearable display device, the modification of the at least one virtual object being selected to alter the at least one emotional state of the user.

2. The method of claim 1, further comprising determining the at least one emotional state of the user for a duration, wherein the action is performed through the AR display system based at least partially on determining that the user is in the at least one emotional state for the duration.

3. The method of claim 2, wherein the at least one emotional state comprises a plurality of different emotional states.

4. The method of claim 1, wherein the stimulus comprises a video game, program, musical background piece, reward, virtual object, or alert, and performing the action comprises making the video game, program, musical background piece, reward, virtual object, or alert more available or less available to the user.

5. The method of claim 1, wherein the stimulus comprises a feature of a video game, program, musical background piece, reward, virtual object, or alert, and performing the action comprises making the video game, program, musical background piece, reward, or alert more available or less available to the user.

6. The method of claim 1, wherein the stimulus comprises a strategy video game, and performing the action comprises making a game move using the at least one emotional state of the user.

7. The method of claim 6, wherein the strategy video game is a playing card video game having one or more simulated players that play against the user, the at least one emotional state is one that indicates whether or not the user is bluffing, and performing the action comprises the one or more simulated players playing cards against the user using knowledge of whether or not the user is bluffing.

8. The method of claim 7, wherein the playing card video game is a poker video game.

9. The method of claim 1, wherein the stimulus comprises a question presented to the user, and performing the action comprises informing the user whether or not the user is lying using the at least one emotional state.

10. The method of claim 1, wherein the stimulus comprises a plurality of options presented to the end user, and performing the action comprises informing the user which option the user prefers using the at least one emotional state.

11. The method of claim 1, wherein the stimulus comprises a simulated face, and performing the action comprises determining if the end user is about to laugh using the specific emotional state determination, and modifying the simulated face to make the user laugh.

12. The method of claim 1, wherein the at least one biometric parameter of the user is sensed at a plurality of different times in response to the presenting the stimulus, and the biometric data is generated at these different times.

13. The method of claim 1, wherein the stimulus is visually presented to the user through the wearable display device.

14. The method of claim 1, wherein the at least one sensed biometric parameter comprises a plurality of different sensed biometric parameters.

15. The method of claim 14, wherein determining the at least one specific emotional state of the user comprises performing a pattern recognition analysis on the generated biometric data.

16. The method of claim 1, wherein the at least one sensed biometric parameter comprises at least one facial expression.

17. The method of claim 16, wherein the least one facial expression is one or both of an attitude of the mouth and crow's feet around the eyes of the end user.

18. The method of claim 17, wherein the at least one emotional state comprises happiness.

19. The method of claim 1, wherein the at least one sensed biometric parameter comprises at least one of a facial expression, hunching of shoulders, respiration rate, heart rate, body temperature, blood pressure, frequency and/or location of hand movements, frequency and/or location of body twitches, and elapsed time between eye movements.

20. The method of claim 1, wherein the at least one sensed biometric parameter comprises at least one micro-expression.

21. The method of claim 1, wherein the at least one emotional state comprises at least one of anger, contempt, disgust, fear, happiness, sadness, surprise, confusion, shame, attentiveness, exhaustion, relaxation, frustration, boredom, embarrassment.

22. The method of claim 1, wherein determining at least one emotional state of the user comprises comparing the generated biometric data to reference biometric data correlated to the at least one emotional state.

23. The method of claim 22, wherein the generated biometric data for one of the at least one sensed biometric parameter is a biometric scalar data value, the reference biometric data comprises a reference biometric value range, and comparing the generated biometric data to the reference biometric data comprises determining whether the biometric scalar data value falls within the reference biometric value range.

24. The method of claim 22, wherein the generated biometric data for one of the at least one sensed biometric parameter is a biometric multi-dimensional data vector, the reference biometric data comprises a reference biometric multi-dimensional data vector, and comparing the generated biometric data to the reference biometric data comprises performing a correlation function between the generated biometric multi-dimensional data vector and the reference biometric multi-dimensional data vector.

25. The method of claim 22, wherein determining the at least one emotional state of the user further comprises retrieving the reference biometric data from a custom emotional state profile of the end user.

26. The method of claim 1, wherein presenting the three-dimensional environment to the user through the wearable display device comprises rendering a plurality of synthetic image frames of a three-dimensional environment, and sequentially displaying the synthetic image frames to the user through wearable display device.

27. The method of claim 26, wherein the synthetic image frames are projected from a transparent display surface in the field of view of the user via a frame structure mounted to the head of the user.

28. The method of claim 26, wherein the synthetic image frames are superimposed over a real scene visualized by the user.

29. The method of claim 1, wherein the AR display system also includes a speaker coupled to the wearable display device, and
wherein the stimulus is aurally presented through the speaker.

30. The method of claim 1, wherein the AR display system also includes a mechanical actuator, and
wherein the stimulus is tactilely presented through the mechanical actuator.

31. The method of claim 1, wherein the at least one sensor comprises a rearward facing camera coupled to the wearable display device, and
wherein the at least one biometric parameter comprises a facial movement of the user.

32. The method of claim 1, wherein the at least one sensor comprises a microphone coupled to the wearable display device.

33. The method of claim 1, wherein the at least one sensor comprises an accelerometer coupled to a body part of the user, and
wherein the at least one biometric parameter comprises a movement of the body part of the user.

34. The method of claim 1, wherein when the determined at least one emotional state of the user is happiness or excitement, the modification of the at least one virtual object increases the presented stimulus.

35. The method of claim 1, wherein when the determined at least one emotional state of the user is frustration or boredom, the modification of the at least one virtual object decreases the presented stimulus.

* * * * *

(12) EX PARTE REEXAMINATION CERTIFICATE (12343rd)
United States Patent
Sanger et al.

(10) Number: US 10,540,004 C1
(45) Certificate Issued: Aug. 1, 2023

(54) TECHNIQUE FOR CONTROLLING VIRTUAL IMAGE GENERATION SYSTEM USING EMOTIONAL STATES OF USER

(71) Applicant: MAGIC LEAP, INC., Plantation, FL (US)

(72) Inventors: George Alistair Sanger, Coronado, CA (US); Samuel A. Miller, Hollywood, FL (US); Graeme John Devine, Rockwall, TX (US)

(73) Assignee: MAGIC LEAP, INC., Plantation, FL (US)

Reexamination Request:
No. 90/015,034, May 20, 2022

Reexamination Certificate for:
Patent No.: 10,540,004
Issued: Jan. 21, 2020
Appl. No.: 15/655,563
Filed: Jul. 20, 2017

Related U.S. Application Data

(60) Provisional application No. 62/364,957, filed on Jul. 21, 2016.

(51) Int. Cl.
| | |
|---|---|
| *A63F 13/52* | (2014.01) |
| *G06F 3/01* | (2006.01) |
| *A63F 13/21* | (2014.01) |
| *A63F 13/212* | (2014.01) |
| *A63F 13/65* | (2014.01) |
| *A63F 13/822* | (2014.01) |
| *G06F 16/58* | (2019.01) |
| *G06F 16/56* | (2019.01) |
| *G06V 20/20* | (2022.01) |
| *G06V 40/16* | (2022.01) |
| *G02B 27/01* | (2006.01) |
| *G06F 3/03* | (2006.01) |
| *G06T 19/00* | (2011.01) |

(52) U.S. Cl.
CPC .............. *G06F 3/012* (2013.01); *A63F 13/21* (2014.09); *A63F 13/212* (2014.09); *A63F 13/52* (2014.09); *A63F 13/65* (2014.09); *A63F 13/822* (2014.09); *G02B 27/017* (2013.01); *G06F 3/011* (2013.01); *G06F 3/0304* (2013.01); *G06F 16/56* (2019.01); *G06F 16/5866* (2019.01); *G06T 19/006* (2013.01); *G06V 20/20* (2022.01); *G06V 40/175* (2022.01); *G02B 27/0172* (2013.01); *G02B 2027/014* (2013.01); *G02B 2027/0134* (2013.01); *G02B 2027/0138* (2013.01); *G02B 2027/0187* (2013.01); *G06F 3/013* (2013.01); *G06F 3/015* (2013.01); *G06F 2203/011* (2013.01)

(58) Field of Classification Search
None
See application file for complete search history.

(56) References Cited

To view the complete listing of prior art documents cited during the proceeding for Reexamination Control Number 90/015,034, please refer to the USPTO's Patent Electronic System.

*Primary Examiner* — Deandra M Hughes

(57) ABSTRACT

A method of operating a virtual image generation system comprises allowing an end user to interact with a three-dimensional environment comprising at least one virtual object, presenting a stimulus to the end user in the context of the three-dimensional environment, sensing at least one biometric parameter of the end user in response to the presentation of the stimulus to the end user, generating biometric data for each of the sensed biometric parameter(s), determining if the end user is in at least one specific emotional state based on the biometric data for the each of the sensed biometric parameter(s), and performing an action discernible to the end user to facilitate a current objective at least partially based on if it is determined that the end user is in the specific emotional state(s).

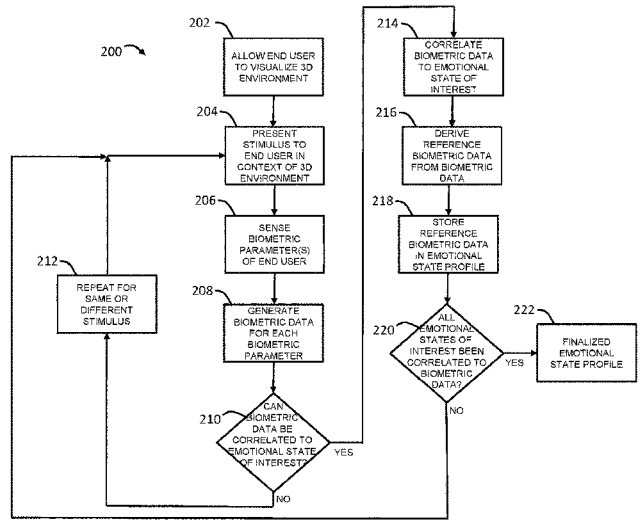

US 10,540,004 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 18 and 21 are cancelled.

Claims 1-7, 9-11, 15, 17, 19, 22-24 and 33-34 are determined to be patentable as amended.

Claims 8, 12-14, 16, 20, 25-32 and 35, dependent on an amended claim, are determined to be patentable.

New claims 36-45 are added and determined to be patentable.

1. A method of operating an augmented reality (AR) display system that includes a wearable display device, the method comprising:
   presenting an interactive three-dimensional (*3D*) environment to a user through the wearable display device, the interactive three-dimensional environment comprising a real-world scene and at least one virtual object that is generated by the AR display system and presented within the real-world scene;
   *performing a first action that presents a stimulus in the interactive 3D environment to the user;*
   responsive to presenting [a] *the* stimulus in the three-dimensional environment, sensing at least one biometric parameter of the user, the at least one biometric parameter sensed using at least one sensor that is attached to the wearable display device;
   generating biometric data for each of the at least one sensed biometric parameter;
   determining *whether* at least one emotional state of the user *is happiness* based on the biometric data for the each of the at least one sensed biometric parameter; [and]
   performing [an] *a second* action through the AR display system based at least partly on determining that the user is in the at least one emotional state, *wherein the second action includes a modification of the at least one virtual object while it is being presented to the user through the wearable display device, the modification of the at least one virtual object being selected to alter the at least one emotional state of the user; and*
   *in response to performing the second action through the AR system, generating additional biometric data for the user; and*
   *determining that the user is experiencing happiness for a duration of time based at least upon the additional biometric data, wherein the at least one emotional state of the user is altered into happiness, and wherein determining that the user is experiencing happiness for the duration of time comprises:*
   *determining a distance range from a plurality of distance ranges to which a value in the biometric data belongs, wherein the value is indicative of a first extent of a smile and is associated with a first weight in determining that the at least one emo-tional state indicates that the user is experiencing happiness for the duration of time;*
   *determining a correlation coefficient range from a plurality of correlation coefficient ranges to which a second value in the biometric data belongs, wherein the second value is indicative of a second extent of crow's feet and is associated with a second weight in determining that the at least one emotional state indicates that the user is experiencing happiness for the duration of time; and*
   *determining that the at least one emotional state indicates that the user is experiencing happiness based at least in part upon the distance range, the correlation coefficient range, and the duration of time.*

2. The method of claim 1, [further comprising determining the at least one emotional state of the user for a duration,] wherein the *second* action is performed through the AR display system based at least partially on determining that the user is in the at least one emotional state for the duration.

3. The method of claim [2] *1*, wherein the [at least one emotional state] *method further* comprises *determining that the user is not in* a plurality of different emotional states *for the duration of time*.

4. The method of claim 1, wherein the stimulus comprises a video game, program, musical background piece, reward, virtual object, or alert, and performing the *second* action comprises making the video game, program, musical background piece, reward, virtual object, or alert more available or less available to the user.

5. The method of claim 1, wherein the stimulus comprises a feature of a video game, program, musical background piece, reward, virtual object, or alert, and performing the *second* action comprises making the video game, program, musical background piece, reward, or alert more available or less available to the user.

6. The method of claim 1, wherein the stimulus comprises a strategy video game, and performing the *second* action comprises making a game move using the at least one emotional state of the user.

7. The method of claim 6, wherein the strategy video game is a playing card video game having one or more simulated players that play against the user, the at least one emotional state is one that indicates whether or not the user is bluffing, and performing the *second* action comprises the one or more simulated players playing cards against the user using knowledge of whether or not the user is bluffing.

9. The method of claim 1, wherein the stimulus comprises a question presented to the user, and performing the *second* action comprises informing the user whether or not the user is lying using the at least one emotional state.

10. The method of claim 1, wherein the stimulus comprises a plurality of options presented to the end user, and performing the *second* action comprises informing the user which option the user prefers using the at least one emotional state.

11. The method of claim 1, wherein the stimulus comprises a simulated face, and performing the *second* action comprises determining if the end user is about to laugh using the specific emotional state determination, and modifying the simulated face to make the user laugh.

15. The method of claim 14, wherein determining the at least one [specific] emotional state of the user comprises performing a pattern recognition analysis on the generated biometric data.

17. The method of claim 16, wherein the least one facial expression is one or both of an attitude of the mouth and *the crow's feet around the eyes of the end user*.

19. The method of claim 1, wherein the at least one sensed biometric parameter *further* comprises at least one of a facial expression, hunching of shoulders, respiration rate, heart rate, body temperature, blood pressure, frequency and/or location of hand movements, frequency and/or location of body twitches, and elapsed time between eye movements.

22. The method of claim 1, wherein determining at least one emotional state of the user comprises comparing the [generated] *additional* biometric data to reference biometric data correlated to the at least one emotional state.

23. The method of claim 22, wherein the [generated] *additional* biometric data for one of the at least one sensed biometric parameter is a biometric scalar data value, the reference biometric data comprises a reference biometric value range, and comparing the generated biometric data to the reference biometric data comprises determining whether the biometric scalar data value falls within the reference biometric value range.

24. The method of claim 22, wherein the [generated] *additional* biometric data for one of the at least one sensed biometric parameter is a biometric multi-dimensional data vector, the reference biometric data comprises a reference biometric multi-dimensional data vector, and comparing the generated biometric data to the reference biometric data comprises performing a correlation function between the generated biometric multi-dimensional data vector and the reference biometric multi-dimensional data vector.

33. The method of claim 1, wherein *the wearable display device comprises* the at least one sensor [comprises] *and* an accelerometer *that is* coupled to a body part of the user, and wherein the at least one biometric parameter comprises *the biometric data sensed by the at least one sensor and a* movement of the body part of the user *sensed by the accelerator*.

34. The method of claim 1, wherein when the determined at least one emotional state of the user is [happiness or] excitement, the modification of the at least one virtual object increases the presented stimulus.

36. *The method of claim 1, wherein the plurality of distance ranges includes a low distance range indicative of a slight smile and comprising slight distance values, a medium distance range indicative of a medium smile and including medium distance values greater than the slight distance values, and a high distance range indicative of a full smile and comprising full distance values greater than the medium distances.*

37. *The method of claim 36, wherein the plurality of correlation coefficient ranges comprises a slight correlation coefficient range indicative of slight crow's feet and comprising slight correlation coefficient values, a medium correlation coefficient range indicative of medium crow's feet and comprising medium correlation coefficient values greater than the slight correlation coefficient values, and a full correlation coefficient range indicative of full crow's feet and comprising full correlation coefficient values greater than the medium correlation coefficient values.*

38. *The method of claim 37, wherein the at least one emotional state indicates that the user is experiencing happiness for the duration of time when the distance range determined to be the slight correlation coefficient range, and the distance range is determined to be the high distance range.*

39. *The method of claim 37, wherein the at least one emotional state indicates that the user is experiencing happiness for the duration of time when the distance range determined to be the medium correlation coefficient range or the full correlation coefficient range, and the distance range is determined to be any of the plurality of distance ranges.*

40. *The method of claim 1, wherein determining that the user is experiencing happiness for the duration of time further comprises incrementally changing the stimulus presented to the user, incrementally changing the stimulus comprising:*

*altering the stimulus using a first modification based at least upon a plurality of biometric features for happiness;*

*collecting first biometric data of the user in response to altering the stimulus with the first modification; and*

*determining a first change in the at least one emotional state based on the first biometric data.*

41. *The method of claim 40, wherein incrementally changing the stimulus further comprises:*

*altering the stimulus with the first change using a second modification based at least upon the plurality of biometric features for happiness;*

*collecting second biometric data of the user in response to altering the stimulus with the first change using the second modification;*

*determining a second change in the at least one emotional state with the first change based on the second biometric data; and*

*determining that the at least one emotional state with the first change and the second change is happiness.*

42. *The method of claim 41, wherein the at least one stimulus comprises a tempo of music, the first modification comprises increasing the tempo to a first tempo that is faster than the tempo, and the second modification comprises increasing the first tempo to a second tempo that is faster than the first tempo, wherein the at least one emotional state comprises emotional states inconsistent with true happiness, the at least one emotional state with the first change indicates that the user is not any of the emotional states, and the second change reflects that the user is experiencing true happiness.*

43. *The method of claim 1, wherein the first biometric feature corresponds to one or more data value ranges that respectively correspond to how much corners of a mouth of the user are upturned, and the second biometric feature corresponds to appearance of crow's feet around an eye of the user.*

44. *The method of claim 1, the method further comprising:*

*determining that the user is not truly experiencing happiness based at least in part upon a first biometric feature and a second biometric feature of the biometric data, wherein*

*the duration of time comprises a total number of times within a time period,*

*the first biometric feature corresponds to a plurality of distance ranges that respectively correspond to how much corners of a mouth of the user are upturned, and*

*the second biometric feature corresponds to a plurality of correlation coefficient ranges that respectively indicate appearance of the crow's feet around an eye of the user.*

45. *The method of claim 1, the method further comprising:*

*tracking the duration of time during which the at least one stimulus is presented in the interactive 3D environment to the user;*

*determining that the duration of time exceeds a threshold duration;* in response to a result that the duration of time is determined to exceed the threshold, correlating the biometric data with the at least one emotional state;

determining that the duration of time is shorter than the threshold duration;

determining that the biometric data for the at least one emotional state reflects that the user is truly experiencing happiness; and in response to a determination result that the duration of time is shorter than the threshold, presenting a different stimulus in the interactive 3D environment to the user, wherein the biometric data is not correlated with the desired emotional state due to the determination result that the duration of time is shorter than the threshold.

\* \* \* \* \*